(12) United States Patent
Rios et al.

(10) Patent No.: US 11,535,912 B2
(45) Date of Patent: Dec. 27, 2022

(54) STRUCTURAL DIRECT-WRITE ADDITIVE MANUFACTURING OF MOLTEN METALS

(71) Applicants: UT-Battelle, LLC, Oak Ridge, TN (US); Eck Industries, Inc., Manitowoc, WI (US)

(72) Inventors: Orlando Rios, Knoxville, TN (US); David Weiss, Manitowoc, WI (US); Zachary C. Sims, Knoxville, TN (US); William G. Carter, Oak Ridge, TN (US); Michael S. Kesler, Knoxville, TN (US)

(73) Assignees: UT-Battelle, LLC, Oak Ridge, TN (US); Eck Industries, Inc., Manitowoc, WI (US)

( * ) Notice: Subject to any disclaimer, the term of this patent is extended or adjusted under 35 U.S.C. 154(b) by 22 days.

(21) Appl. No.: 17/361,485

(22) Filed: Jun. 29, 2021

(65) Prior Publication Data

US 2021/0324500 A1    Oct. 21, 2021

Related U.S. Application Data

(63) Continuation of application No. 15/625,161, filed on Jun. 16, 2017, now abandoned.

(Continued)

(51) Int. Cl.
    *C22C 21/00*     (2006.01)
    *B33Y 70/10*     (2020.01)
    (Continued)

(52) U.S. Cl.
    CPC ............ *C22C 21/00* (2013.01); *B22D 23/003* (2013.01); *B33Y 10/00* (2014.12); *B33Y 70/10* (2020.01)

(58) Field of Classification Search
    None
    See application file for complete search history.

(56) References Cited

U.S. PATENT DOCUMENTS

| 4,915,903 A | 4/1990 | Brupbacher et al. |
| 5,593,515 A | 1/1997 | Masumoto et al. |
| (Continued) | | |

FOREIGN PATENT DOCUMENTS

DE    102011111365 A1 *    2/2013    ............... B22F 1/02

OTHER PUBLICATIONS

Grobner, J., et al., "Thermodynamic Aspects of the Constitution, Grain Refining, and Solidification Enthalpies of Al—Ce—Si Alloys", Metallurgical and Materials Transactions A, Nov. 2004, pp. 3349-3362, vol. 35A.

Helmenstine, A., "Eutectic Definition and Examples", Retrieved from https://www.thoughtco.com/eutectic-definition-and-examples-608317, Oct. 28, 2015, 2 pages.

International Search Report dated Sep. 12, 2017 issued in PCT/US2017/37887.

(Continued)

*Primary Examiner* — Christopher S Kessler
(74) *Attorney, Agent, or Firm* — Scully, Scott, Murphy & Presser, P.C.

(57) ABSTRACT

An alloy for structural direct-writing additive manufacturing comprising a base element selected from the group consisting of aluminum (Al), nickel (Ni) and a combination thereof, and a rare earth element selected from the group consisting of cerium (Ce), lanthanide (La) and a combination thereof, and a eutectic intermetallic present in said alloy in an amount ranging from about 0.5 wt. % to 7.5 wt. %. The invention is also directed to a method of structural direct-write additive manufacturing using the above-described alloy, as well as 3D objects produced by the method. The invention is also directed to methods of producing the above-described alloy.

9 Claims, 31 Drawing Sheets

Related U.S. Application Data

(60) Provisional application No. 62/350,749, filed on Jun. 16, 2016.

(51) Int. Cl.
 B33Y 10/00 (2015.01)
 B22D 23/00 (2006.01)

(56) References Cited

U.S. PATENT DOCUMENTS

| | | |
|---|---|---|
| 2005/0123786 A1 | 6/2005 | Honda et al. |
| 2008/0121522 A1 | 5/2008 | Ehira et al. |
| 2016/0053346 A1* | 2/2016 | Szuromi ............ C22C 19/07 75/331 |
| 2016/0121399 A1 | 5/2016 | Buller et al. |
| 2016/0230252 A1 | 8/2016 | Watson et al. |
| 2019/0040496 A1 | 2/2019 | Weiss et al. |

OTHER PUBLICATIONS

Ladd, C. et al., "3D Printing of Free Standing Liquid Metal Microstructures", Adv. Mater., (2013), 25, pp. 5081-5085.

Plotkowski, A. et al., "Evaluation of an Al—Ce alloy for laser additive manufacturing", Acta Materialia (2017), vol. 126, pp. 507-519.

Russel, A.M. et al., "Ductility in Intermetallic Compounds", Advanced Engineering Materials, (2003), vol. 5, pp. 629-639, Abstract.

Sims, Z.C. et al., "Cerium-Based, Intermetallic-Strengthened Aluminum Casting Alloy: High-Volume Co-product Development", JOM, (2016), vol. 68, No. 7, pp. 1940-1947.

Sims, Z. et al., "Characterization of Near Net-shape Castable Rare Earth Modified Aluminum Alloys for Hight Temperature Application", Light Metals, (2016), pp. 111-114.

Weiss, D. et al., "Low Density and Temperature Tolerant Alloys for Automative Applications", Downloaded from SAE international by David Weiss on Mar. 21, 2017, 6 pages.

\* cited by examiner ial direct-write additive manufacturing is less time intensive
than selective laser sintering and e-beam. However, there

STRUCTURAL DIRECT-WRITE ADDITIVE MANUFACTURING OF MOLTEN METALS

CROSS REFERENCE TO RELATED APPLICATION

The present application is a continuation application of U.S. patent application Ser. No. 15/625,161, filed Jun. 16, 2017, which claims the benefit of U.S. Provisional Patent No. 62/350,749, filed Jun. 16, 2016, the entire contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

This invention generally relates to the field of direct-writing additive manufacturing. The invention relates, more particularly, to direct-writing additive manufacturing of metallic materials.

BACKGROUND OF THE INVENTION

Additive manufacturing or three-dimensional (3D) printing is a process for making a 3D object of any shape by depositing and joining materials layer by layer from 3D models. The capability of freeform in fabrication of 3D complex objects without the need for expensive tooling or machining has made additive manufacturing promising for a wide variety of applications.

However, current additive manufacturing technologies lack the capability to efficiently produce 3D objects composed of high melting point materials, particularly metals and metal alloys. Most metal additive manufacturing approaches are based on powder-bed melting techniques, such as laser selective melting or electron beam (e-beam) melting. These technologies are often restricted to a select few materials (i.e., relatively expensive metal powders having particles greater than 1 μm in size) and involve the use of expensive laser and e-beam systems. Therefore, metal additive manufacturing has been heretofore economically unattractive for most applications.

Welding-based additive manufacturing makes use of an electrical arc generated by a non-consumable electrode or directly from a feed material. A plasma plume is generated by the interaction of the electric arc with the gas surrounding the build zone. The high kinetic energy of the plasma coupled with the high thermal gradients associated with the weld pool leads to poor control of deposited materials resulting in low dimensional tolerances and general build quality.

Structural direct-write additive-manufacturing is a method wherein liquid material is deposited from a print head directly onto a print bed, where the material solidifies, retaining an intended shape and bonding with a layer of the same material upon which it is deposited. Costs for structural direct-write additive manufacturing systems are much lower than selective laser sintering and e-beam commonly used in metal additive manufacturing. In addition, structural direct-write additive manufacturing is less time intensive than selective laser sintering and e-beam. However, there remains a need to develop metallic materials that can be more suitably integrated with structural direct-write additive manufacturing.

SUMMARY OF THE INVENTION

In one aspect, the invention is directed to an alloy for structural direct-write additive manufacturing. The alloy described herein includes a base element selected from the group consisting of aluminum and/or nickel, and a rare earth element selected from the group consisting of cerium and/or lanthanide. A eutectic intermetallic of the alloying elements is present in the alloy in an amount ranging from about 0.5 wt. % to 7.5 wt. %.

In another aspect, the invention is directed to a method of fabricating a 3D metallic object using structural direct-write additive manufacturing. The method generally involves heating the above-described alloy to a temperature within 15% above or below a melting point of the alloy in an inert atmosphere, extruding the alloy through a nozzle in the presence of an oxygen-containing atmosphere to form beads of the alloy having a surface tension ranging from about 0.3 N/m to 2.0 N/m. A stabilizing shell is formed surrounding a liquid core of each bead when the beads are exposed to the oxygen-containing atmosphere. The stabilizing shell is rare earth-rich, including oxides of alloying elements and at least one metastable intermetallic of the alloying elements. The method further includes depositing the beads on a substrate and contacting the beads with each other. The rare earth-rich shells of adjacent beads fuse on contact as the beads are cooled down in the oxygen-containing atmosphere. During fusion, a eutectic intermetallic of the alloying elements is formed at an interface of the adjacent beads in an amount greater than that within each of the adjacent beads.

DETAILED DESCRIPTION OF THE INVENTION

In one aspect, the invention is directed to an alloy that is suitable for structural direct-write additive manufacturing. The alloy described herein includes a base element selected from the group consisting of aluminum (Al) and/or nickel (Ni), and a rare earth element selected from the group consisting of cerium (Ce) and/or lanthanide (La). In some embodiments, the alloy is a binary alloy, such as an Al—Ce alloy, Ni—Ce alloy, Al—La alloy, or Ni—Al alloy. In other embodiments, the alloy is a ternary alloy, such as an Al—Ni—Ce alloy, Al—Ni—La alloy, Al—Ce—La alloy, Ni—Ce—Al alloy, Al—Ce—Si alloy, Ni—Ce—Si alloy, Al—La—Si alloy, or Ni—Al—Si alloy. In yet other embodiments, the alloy is a quaternary alloy, such as an Al—Ni—Ce—La alloy, Al—Ni—Ce—Si alloy, Al—Ni—La—Si alloy, Al—Ce—La—Si alloy, or Ni—Ce—Al—Si alloy. Any of the above alloy compositions may or may not also include iron (Fe) and/or magnesium (Mg) and/or carbon (C) to form a higher alloy.

The alloy of the present invention has the following characteristics which make it feasible to be used in structural direct-write additive manufacturing. First, when molten, a surface tension of the molten alloy falls within a specific range in ambient atmosphere such that the molten alloy forms free-standing beads as the molten alloy is extruded from a nozzle of a 3D printing system and deposited either upon a substrate or upon a previously deposited layer of beads. In one embodiment, the molten alloy has a surface tension ranging from about 0.3 N/m to 2.0 N/m. This range encompasses unprintable metals, such as mercury and molten iron. It has herein been found that a molten alloy having a surface tension below 0.3 N/m is largely incapable of forming beads, and instead flows freely, which is deleterious to structural direct-write additive manufacturing. It has also herein been found that a molten alloy having a surface tension above 2.0 N/M is largely incapable of forming beads, and instead forms clumps, which is also deleterious to structural direct-write additive manufacturing.

Figure 1:
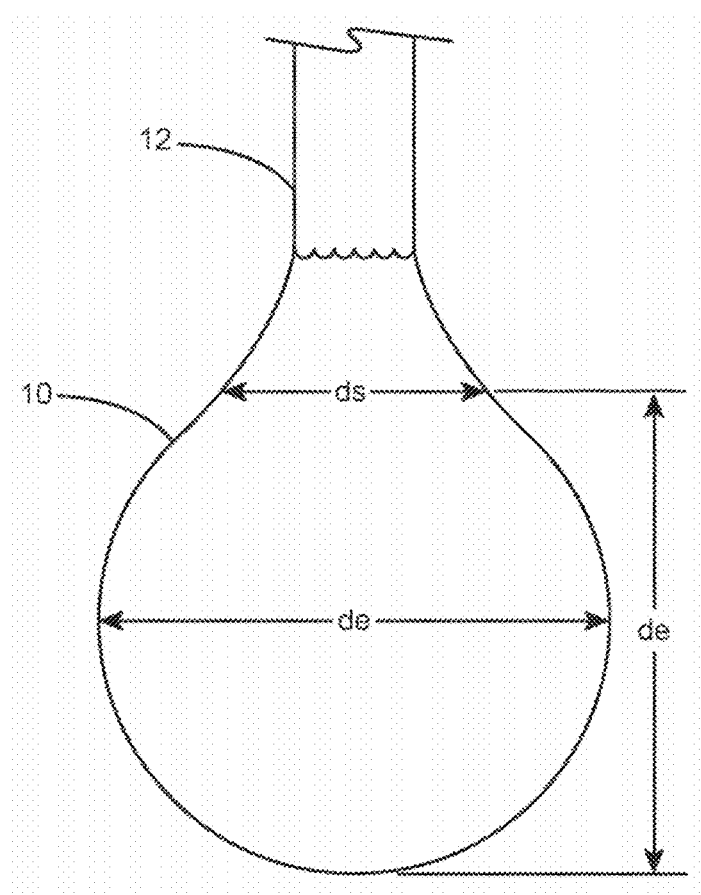
FIG. 1 is a schematic diagram showing a droplet of a molten alloy of the present invention suspended from a nozzle.
Figure 2:
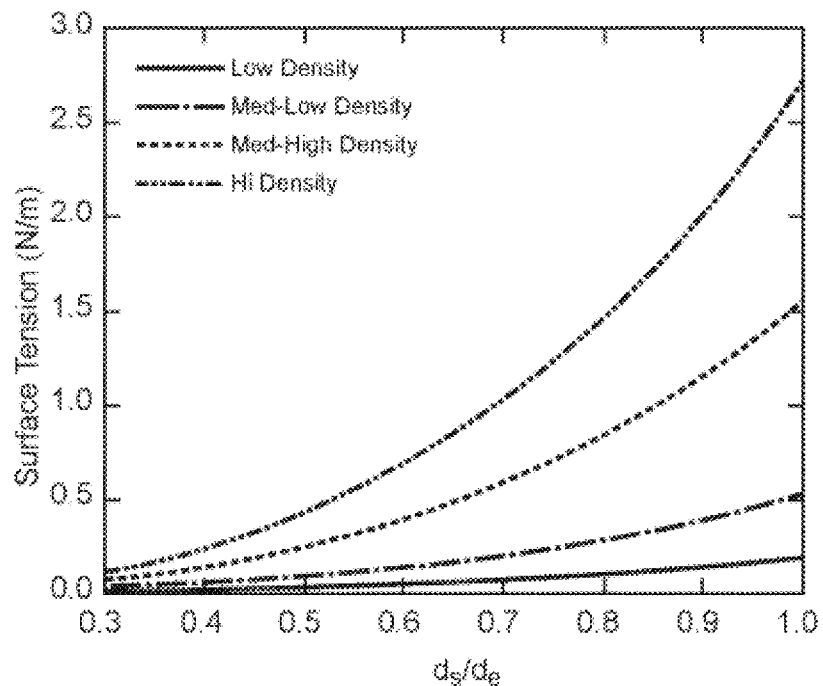
FIG. 2 is a graph showing surface tension vs. drop-shape (ds vs.de) for alloys with different densities including Al—Li, Al—Mg, Al-rare earth alloys, Mg-rare earth alloys, and Fe-rare earth alloys.

FIG. 1 depicts a droplet (i.e., bead) of a molten alloy 10 suspended from a nozzle 12. The surface tension of the droplet can be calculated by the following formula:

$$\gamma = (\Delta p g d e 2) \times (1/H)$$

where $\gamma$ is surface tension, $\Delta p$ is density difference between the two fluids of interest (e.g., for Al extrusion in a gaseous atmosphere the density of aluminum is an appropriate approximation), g is gravity acceleration, and $1/H$ is a correction factor determined from ds/de via second order partial differential Laplacian approximations of droplet shape. Additional information on the calculation of the surface tension of droplet can be found in J. M. Andreas, et al. "Boundary Tension by Pendant Drops", presented at the Fifteenth Colloid Symposium, held at Cambridge, Mass., Jun. 9-11, 1938, the contents of which are herein incorporated by reference in their entirety. FIG. 2 shows surface tension vs. droplet aspect ratio (ds/de) for alloys with different densities, e.g., alloys with low density, medium-to-low density, medium-to-high density, and high density. These alloys include Al—Li, Al—Mg, Al-rare earth alloys having densities in the range of 1-2.7 g/cm³, Mg-rare earth alloys having densities in the range of 1.5-2.2 g/cm³, and Fe-rare earth alloys having densities in the range of 7-8 g/cm³. It can be seen that operable surface tension for alloys of different densities generally falls in the range of 0.3 N/m to 2.0 N/m.

Figure 3:
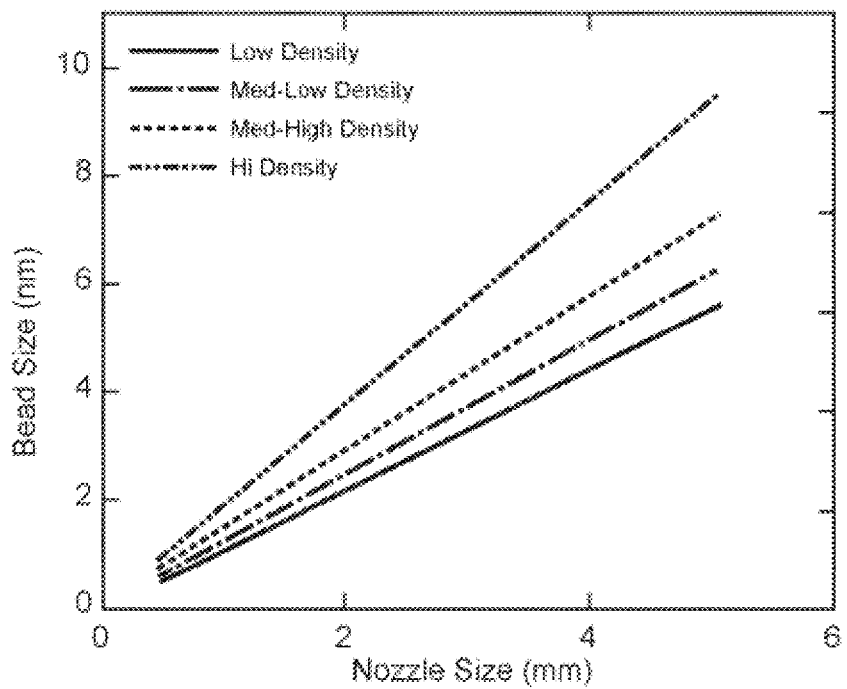
FIG. 3 is a graph showing bead size vs. nozzle diameter defined by ds for various alloys with different densities including Al-rare earth alloys, Mg-rare earth alloys, and Fe-rare earth alloys.

Beads of the alloy may have any shape. Typically, the beads are substantially spherical or ovoid. The sizes of the beads are primarily determined by the size of the nozzle 12 and physical properties of the alloy. FIG. 3 shows projected bead size for various alloys with different densities in the operable surface tension range vs. nozzle diameter. These alloys include Al-rare earth alloys having densities in the range of 1-2.7 g/cm$^3$, Mg-rare earth alloys having densities in the range of 1.5-2.2 g/cm$^3$, and Fe-rare earth alloys having densities in the range of 7-8 g/cm$^3$. It can be seen that, for a given nozzle size, the bead size increases with higher alloy density.

The proportions of the alloying elements in the alloy are chosen such that a eutectic intermetallic of the alloying elements is present in the alloy as a segregated phase in an amount ranging from about 0.5 to 7.5 wt. %, preferably about 0.5 to 7 wt. %. In different embodiments, the eutectic intermetallic is present in an amount of, for example, 0.5, 1, 1.5, 2, 2.5, 3, 3.5, 4, 4.5, 5, 5.5, 6, 6.5, 7, or 7.5 wt. %, or within a range bounded by any two of the foregoing values. The eutectic intermetallic can affect the viscosity of the molten alloy, thereby affecting its printability.

The alloy of the present invention also exhibits a unique coupling of surface tension and surface chemistry to stabilize the material mechanical properties once printed. Once the molten alloy is extruded through the nozzle 12 to form freestanding beads, each bead is stabilized mechanically by a stabilizing shell that is formed spontaneously on its surface when the beads are exposed to an oxygen-containing atmosphere, such as, for example, ambient atmosphere. The stabilizing shell stabilizes the surface tension on material flow and protects the bulk composition of the alloy from degradation. The stabilizing shell is composed of oxides of the alloying elements (e.g., native oxides of the alloy elements and secondary oxide) and at least one metastable intermetallic of the alloying elements. The stabilizing shell has a rare earth content higher than that in the eutectic intermetallic (i.e., it is "rare-earth rich"). The stabilizing shell may be formed to have a thickness ranging from, for example, about 10 to 15 nm.

Beads of the alloy of the present invention also have a self-welding ability. Upon contact with each other, the reaction between the stabilizing shells of adjacent beads produces a higher concentration eutectic intermetallic at the interface, thereby fusing the beads together.

In some embodiments, the alloy may contain Ce in an amount up to about 8 wt. %, such as an alloy containing Al and Ce with a Ce content in an amount up to about 8 wt. %. In one embodiment, the alloy includes Ce in an amount of about 0.5 to about 7 wt. %, or more specifically, about 1 to about 6 wt. %. The eutectic intermetallic present in the Al—Ce alloy may be, for example, $Al_{11}Ce_3$.

In some embodiments, at least a portion of the Ce in the alloy is substituted by La. In some embodiments, each part by weight of Ce is substituted by 1.2 parts by weight of La. In other embodiments, all of the Ce in the alloy is substituted by La, and the alloy includes Al and La, with a La content in an amount up to about 10 wt. %. The eutectic intermetallic present in the Al—La alloy may be, for example, $Al_{11}La_3$.

Figure 4:
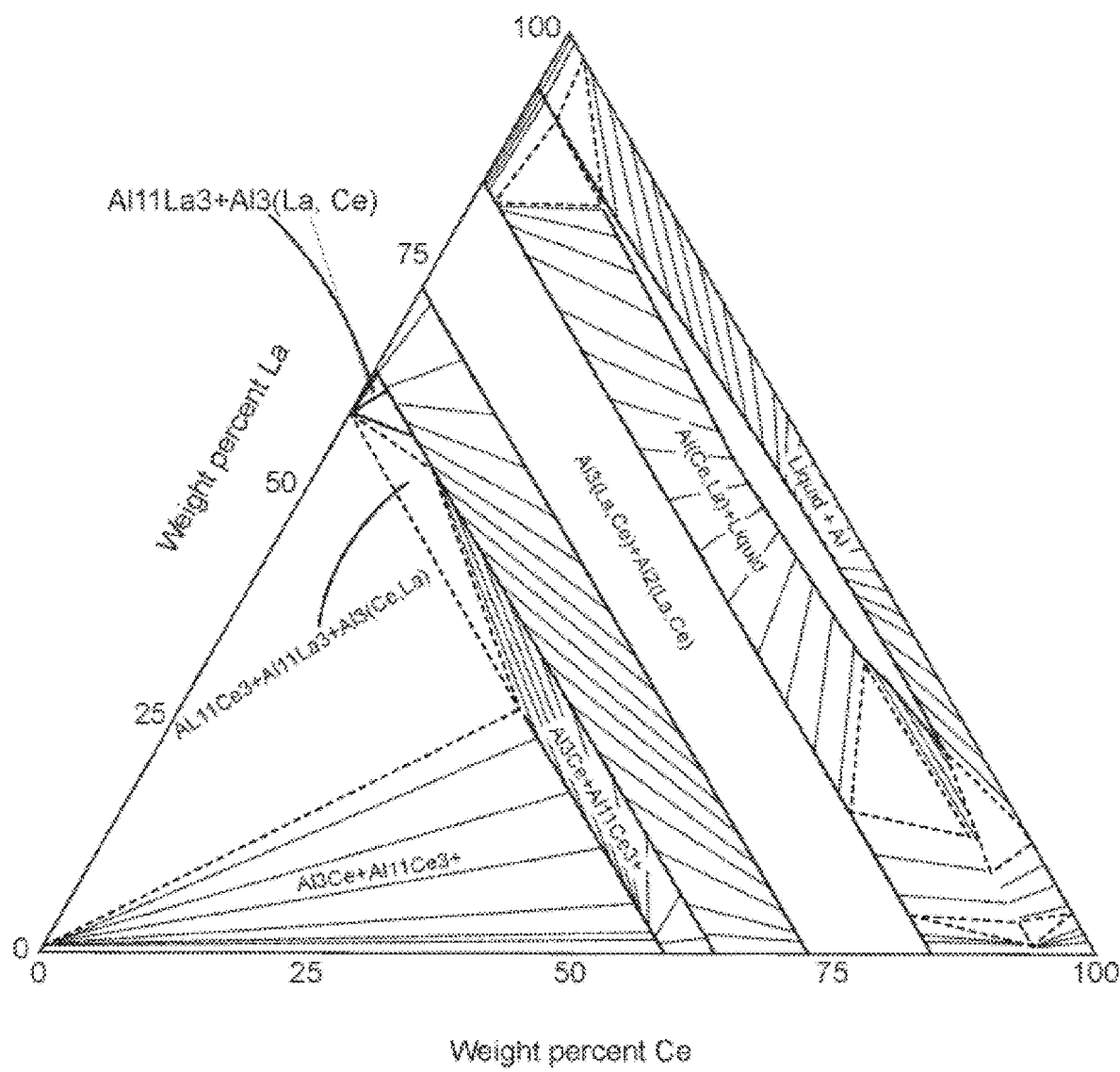
FIG. 4 is a graph showing a ternary isotherm for an Al—Ce—La alloy at 500° C.
Figure 5:
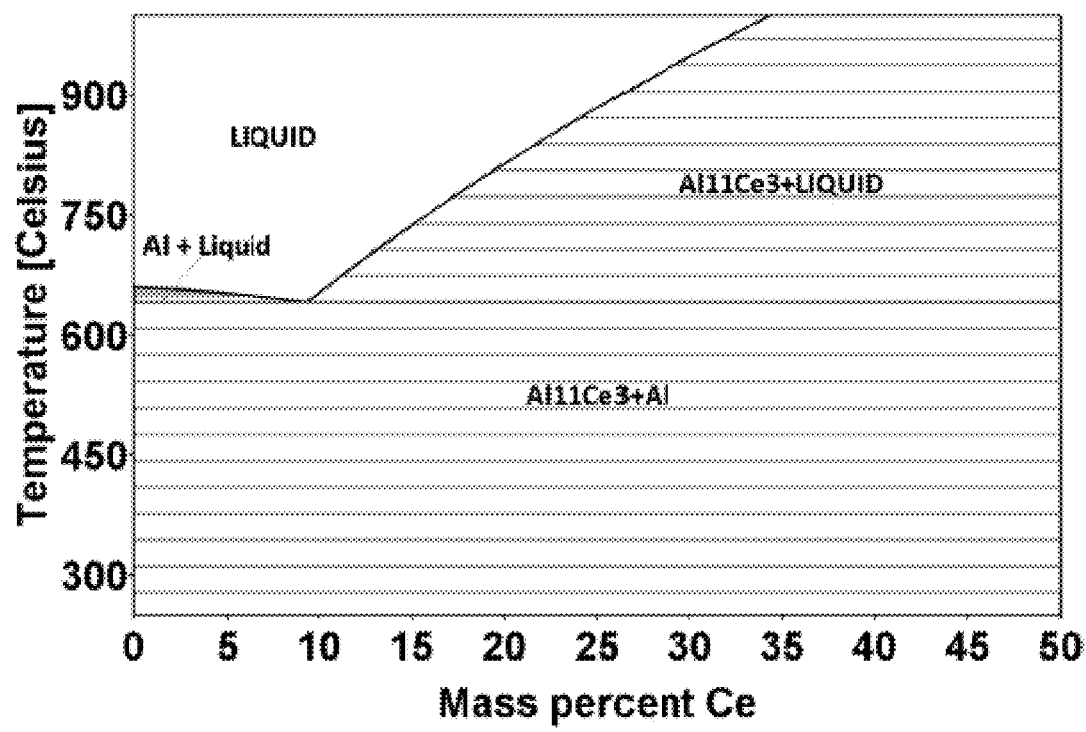
FIG. 5 is a low percentage binary phase diagram for an Al—Ce alloy.
Figure 6:
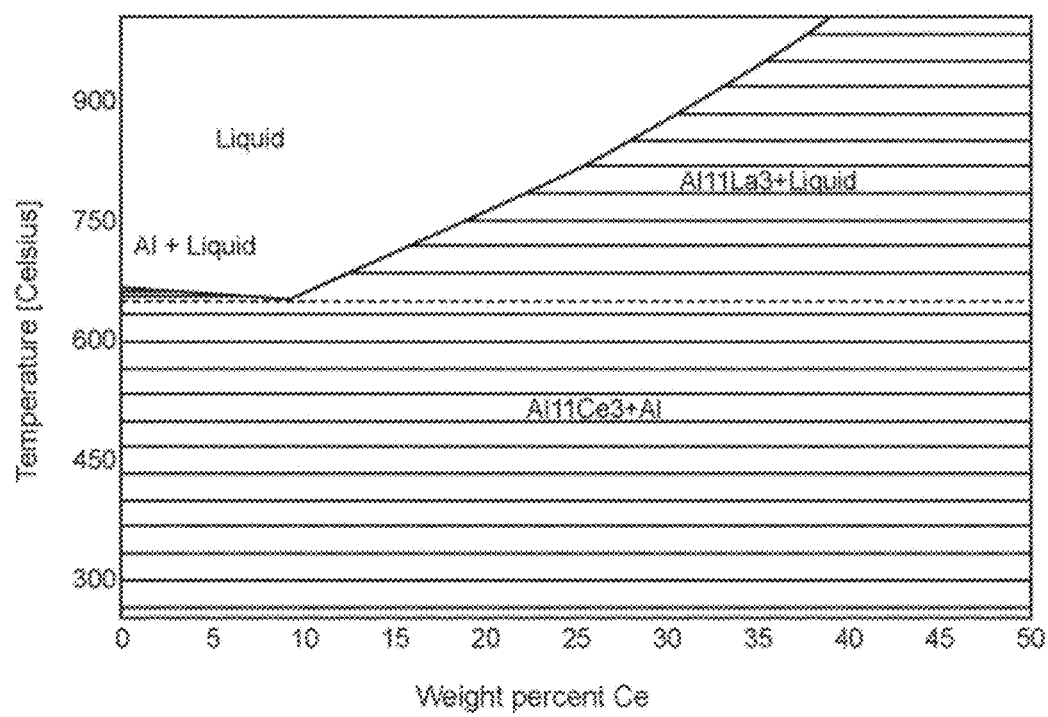
FIG. 6 is a low percentage binary phase diagram for an Al—La alloy.

FIG. 4 is an isotherm for an Al—Ce—La alloy at 500° C. Mirroring in the phases is observed as compositional amounts of Ce and La are varied, indicating the high similarity between Ce and La. FIGS. 5 and 6 are low percentage binary phase diagrams for an Al—Ce alloy and an Al—La alloy. Notably, the foregoing phase diagrams appear nearly identical except for a slight suppression in the melting temperature of the hyper and hypo-eutectic regions.

In some embodiments, the alloy may also include one or more additional alloying elements such as, for example, iron (Fe), silicon (Si), and magnesium (Mg). The alloy may contain up to about 2 wt. % of Fe, up to about 2 wt. % of Si, or up to about 30 wt. % of Mg. Some particular examples of alloys include Al—Ce, Al—La, Al—Ce—La, Al—Ce—La—Si, Al—Ce—Si, Al—La—Si, Al—Ce—Ni, and Ce—Ni alloys.

In some embodiments, the alloy may further include a minor additive, such as SiC, carbon nanotube (CNT), alumina, or boron nitride. The minor additive can typically constitute up to about 30 vol % of the alloy. The minor additive may be employed, for example, to increase the loss modulus (i.e., viscosity) of the molten alloy. Increasing the loss modulus can stabilize the molten and semi-solid beads as the beads cool down.

In another aspect, the invention is directed to a method for fabricating a 3-D metallic object from the alloy described above using structural direct-write additive manufacturing. The method entails first providing an alloy, as described above, and feeding the alloy into a feed chamber of a 3D printing system. The feed chamber is connected to the nozzle 12, shown in FIG. 1. In some embodiments, the nozzle 12 has a diameter up to about 10 mm, or more typically from about 0.1 mm to 2 mm. Inert gas, such as nitrogen or argon, is supplied to the feed chamber and the nozzle 12 to create an inert atmosphere; thus, before exiting the nozzle 12, the alloy is protected by the inert atmosphere. The alloy can be provided in any suitable form, such as an alloy wire, alloy ingot, or as a mixture of constituent alloying element powders.

The method further includes heating the alloy to provide a molten alloy. The alloy can be heated to a temperature at which the alloy can consistently be extruded through the nozzle 12. The alloy is typically heated to a temperature within 15%, within 10%, within 5%, or within 2% above or below a melting point of the alloy. For example, when the alloy is an Al—Ce alloy, the Al—Ce alloy can generally be heated above 650° C. In some embodiments, heating the alloy includes heating with one or more heating elements surrounding the feed chamber and the nozzle 12. Energy can be coupled to the alloy inside the feed chamber and the nozzle 12 either via conduction heating or electromagnetic heating in order to precisely control the extrusion temperature of the alloy. In some embodiments, one or more heating elements are resistance heating elements. In some embodiments, the one or more heating elements are disposed inside the nozzle 12. In some embodiments, the one or more heating elements are configured to provide a nozzle temperature that increases toward an extrusion opening of the nozzle 12. In some embodiments, the heating elements are arranged in increasing density toward the extrusion opening of the nozzle 12, operating at increasing power toward the extrusion opening of the nozzle 12, or both.

Subsequently, the molten alloy is extruded through the nozzle 12 via pneumatic or mechanical pressure to form beads. These beads have a surface tension ranging from about 0.3 N/m to 2.0 N/m. Upon exiting the nozzle 12, a stabilizing shell composed of oxides of the alloying elements and at least one metastable intermetallic of the alloying elements is formed on a surface of each alloy bead, surrounding a liquid core of the bead as the bead is exposed to an oxygen-containing atmosphere (e.g., ambient atmosphere). The at least one metastable intermetallic can be a rare earth-rich intermetallic having a rare earth content greater than that in the eutectic intermetallic or a rare earth-deficient intermetallic having a rare earth content lower than that in the eutectic intermetallic. In one embodiment, when the alloy is an Al—Ce alloy, the at least one metastable intermetallic formed in the stabilizing shell may include $Al_2Ce$ and/or $Al_4Ce$. As the bead cools, the liquid core begins solidifying.

Figure 7:
FIG. 7 is a depiction of a first continuous filament of beads of an alloy of the present invention being deposited on a substrate by a nozzle.

Next, referring to FIG. 7, the beads of the alloy are deposited one by one by contacting previously deposited beads on a substrate 16 from the nozzle 12. The stabilizing shells of adjacent beads fuse on contact as beads are cooled down in the oxygen-containing atmosphere at ambient temperature, forming a first continuous filament 14 on the substrate 16 in a predetermined pattern. After fusion, the eutectic intermetallic is formed at an interface of adjacent beads in a higher concentration than that within each bead.

Figure 8:
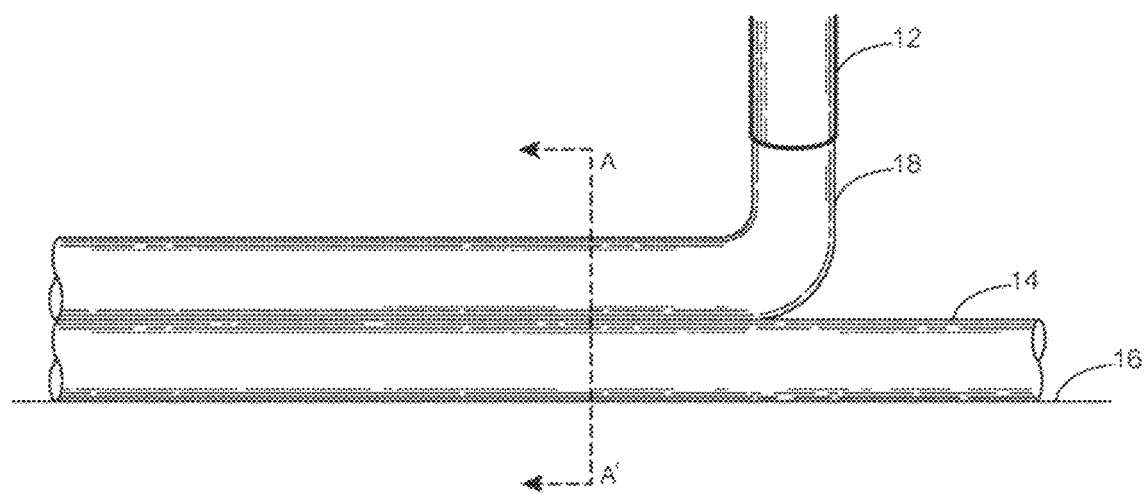
FIG. 8 is a depiction of a second continuous filament of beads of the alloy of FIG. 7 being formed onto the first continuous filament by the nozzle.
Figure 9:
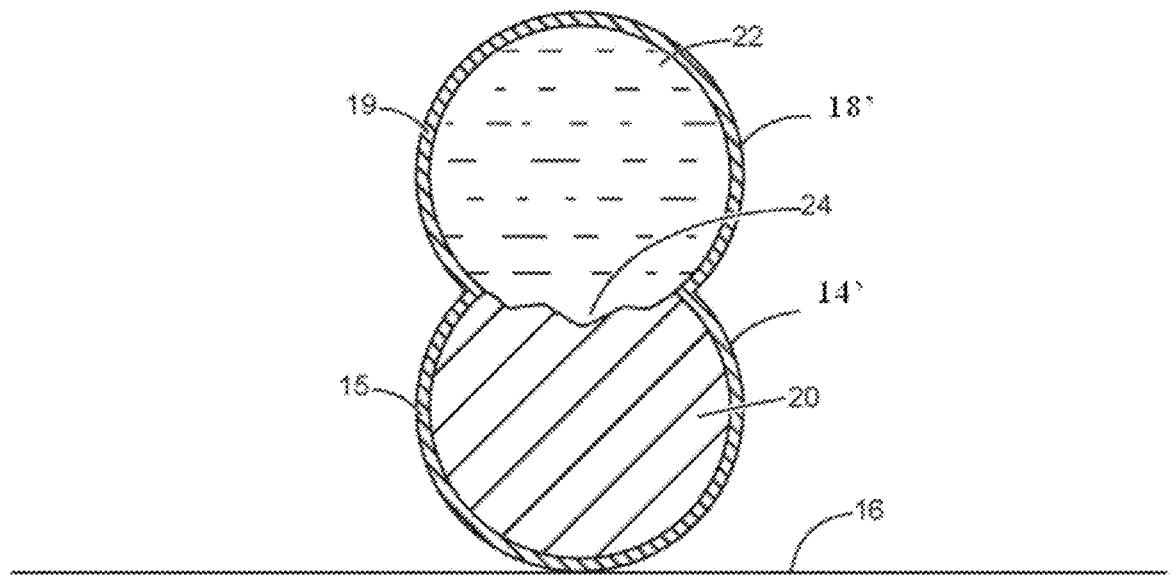
FIG. 9 is a cross-sectional view through A-A' of FIG. 8.

Referring to FIGS. 8 and 9, once the first continuous filament 14 is formed, deposition of the beads begins one by one on top of the previous layer of fused beads (e.g., the first continues filament 14) to form a second continuous filament 18. The stabilizing shells of beads in the second continuous filament 18 fuse with the rare earth-rich shells of beads in the first continuous filament 14 on contact, welding (24) the first and second continuous filaments 14, 18 together. At the time of fusion, the lower bead 14' has a stabilizing shell 15 and an at least partially solidified core 20, while the upper bead 18' has a stabilizing shell 19 and a mostly liquid core 22. Deposition of beads of the alloy continues in this manner, layer by layer, until the entire 3D metallic object is completed. During deposition, the nozzle 12 may be moved with respect to the substrate 16. In one embodiment, either the nozzle 12 may be moved or the substrate 16 may be moved. In another embodiment, both of the nozzle 12 and the substrate 12 may be moved to cause relative motion between the nozzle 12 and the substrate 16). The dotted line spanning across A and A' in FIG. 8 refers to the cross-section. The cross-sectional view through A-A' is provided in FIG. 9.

Figure 10:
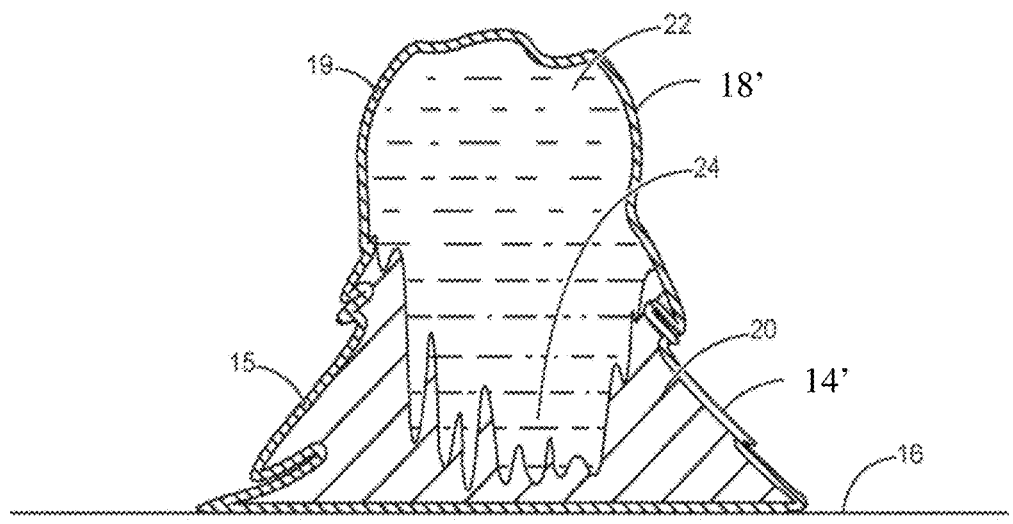
FIG. 10 is a cross-sectional diagram showing the outcome of beads of the alloy of FIG. 7 being deposited too quickly and/or at too high of a temperature.
Figure 11:
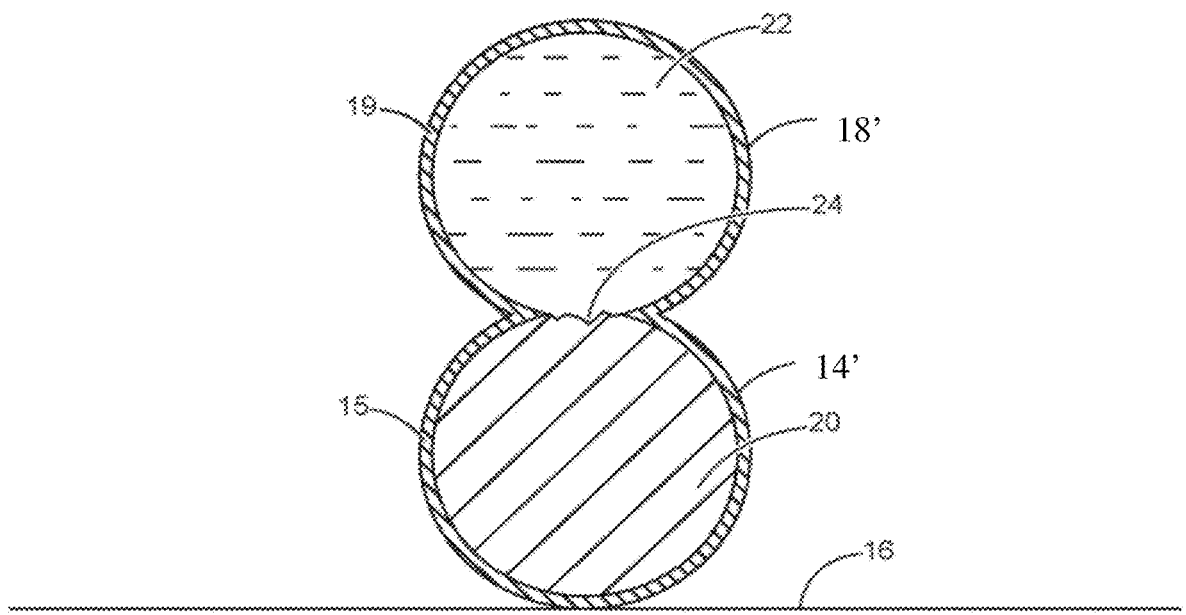
FIG. 11 is a cross-sectional diagram showing the outcome of beads of the alloy of FIG. 7 being deposited too slowly and/or at too low of a temperature.

The printing conditions employed, such as extruding rate and melting temperature, are carefully controlled to ensure proper welding of the consecutive layers. For example, if beads of the alloy are deposited too quickly and/or at too high of a temperature, the beads will be deformed, as shown in FIG. 10, and may even collapse. Conversely, if beads of the alloy are deposited too slowly and/or at too low of a temperature, the beads will solidify too quickly, resulting in unsatisfactory self-welding, as shown in FIG. 11.

Strong interlayer welding is important to prevent the material from delaminating during printing and end user application. Depending on the composition of the stabilizing shell formed, the self-welding of layers of beads of the alloy of the present invention can be attributed to the following reactions occurred at layer-to-layer interface or bead-to-bead interface in the same layer.

Figure 12:
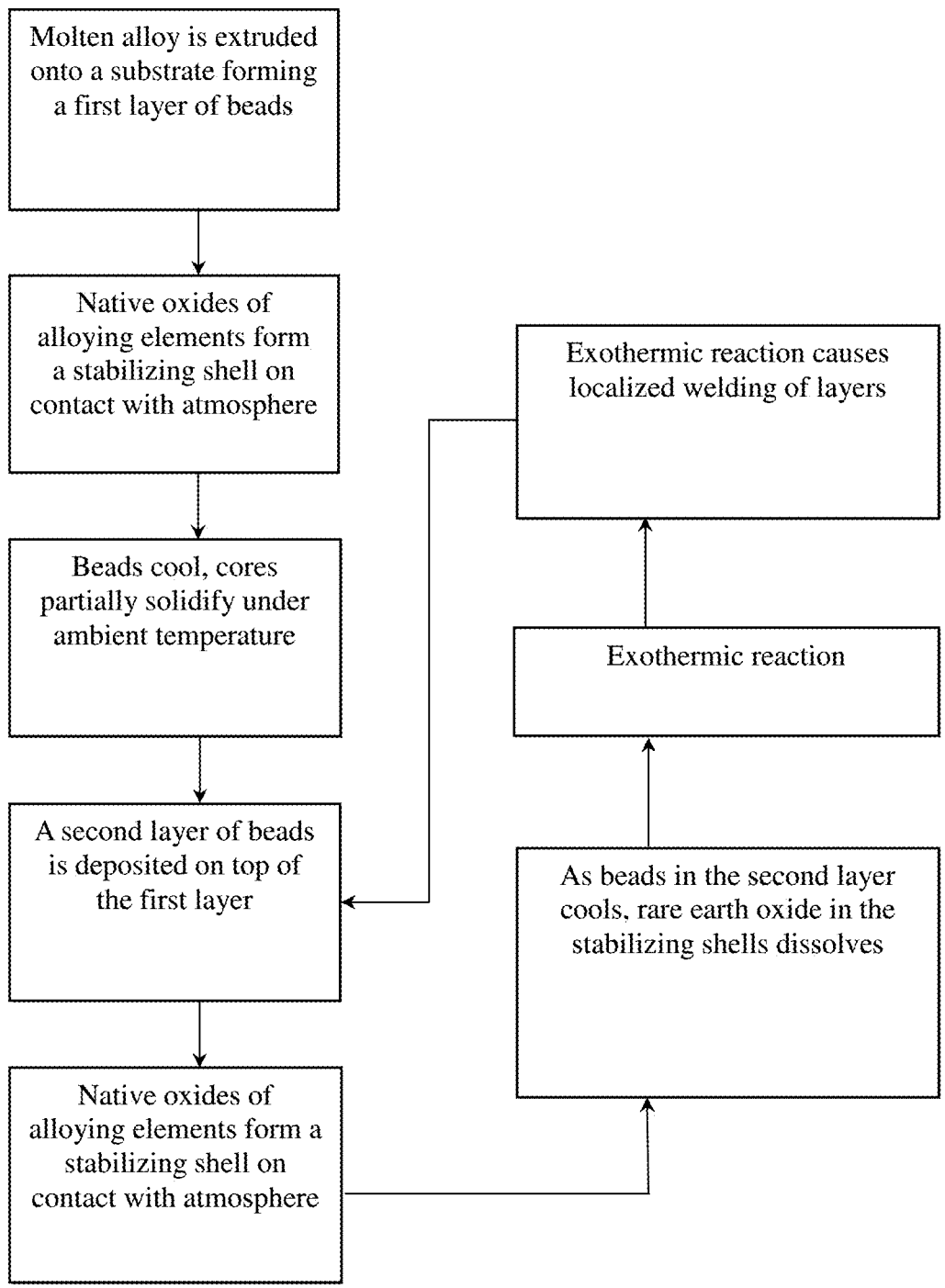
FIG. 12 is a flowchart illustrating a first mechanism that may account for the formation of fused layers of beads of an alloy of the present invention.

FIG. 12 is a flowchart illustrating a first mechanism that may account for the formation of the fused layers of beads of the alloy. As shown, a molten alloy of the present invention is extruded onto a substrate, thereby forming a first layer of beads. A stabilizing shell composed of native oxides of alloying elements is formed on a surface of each bead in the first layer once the bead is contacted with the ambient atmosphere. As beads in the first layer cool, cores of beads partially solidify under ambient temperature. A second layer of beads is then deposited on top of the first layer. A stabilizing shell composed of native oxides of alloying elements is formed on a surface of each bead in the second layer once the bead is contacted with ambient atmosphere. As beads in the second layer cool, an exothermic reaction occurs between the base element and the rare earth oxide present at interfaces of the beads to result in the eutectic intermetallic at these interfaces; the rare earth oxide thus dissolves at the interfaces of the beads. The exothermic reaction causes localized welding of layers. The remaining oxide precipitates of the base element help to strengthen the bonds between layers.

Figure 13:
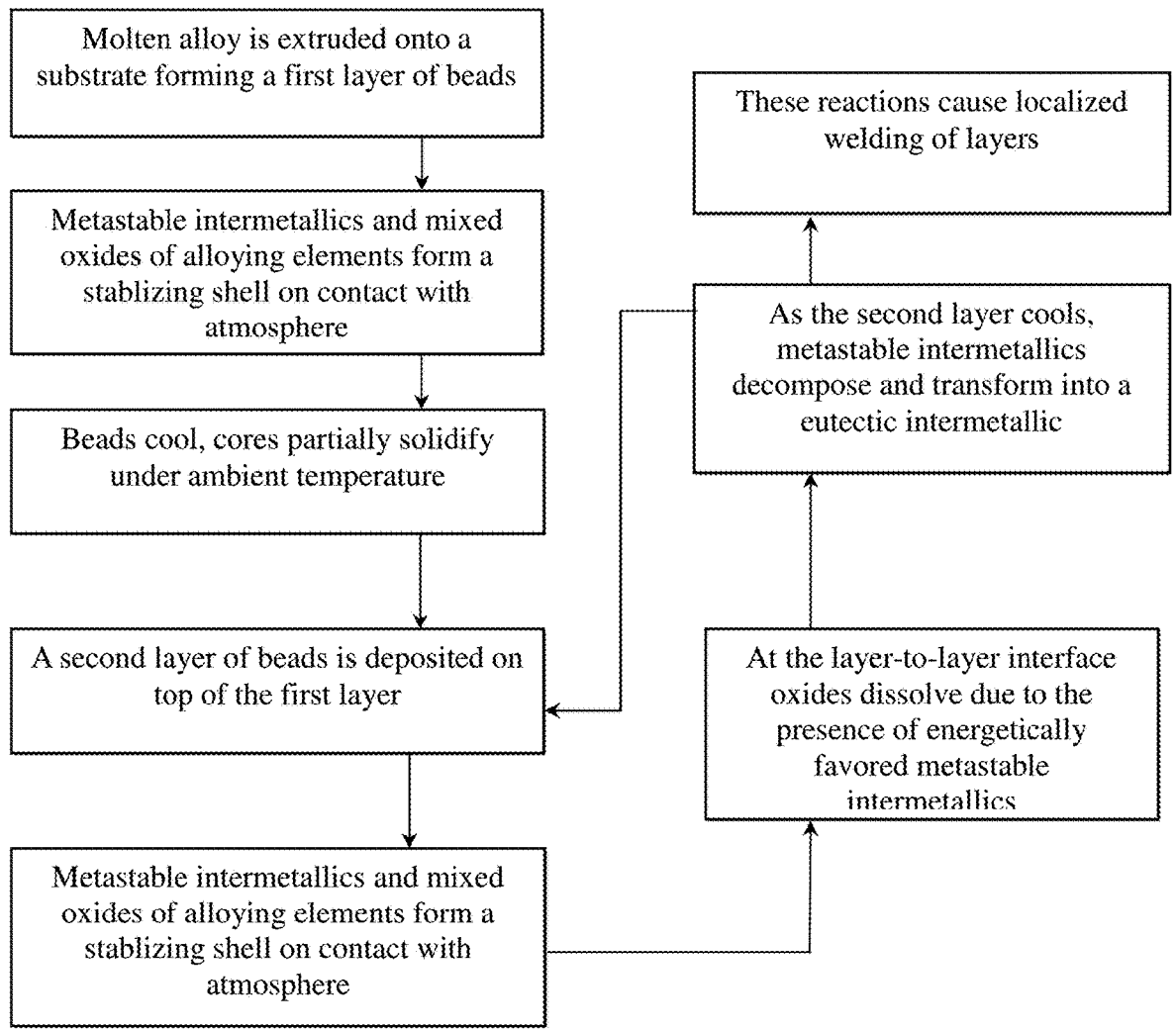
FIG. 13 is a flowchart illustrating a second mechanism that may account for the formation of fused layers of beads of an alloy of the present invention.

FIG. 13 is a flowchart illustrating a second mechanism that may account for the formation of fused layers of beads of the alloy. As shown, a molten alloy of the present invention is extruded onto a substrate, thereby forming a first layer of beads. A stabilizing shell composed of metastable intermetallics and mixed oxides of alloying elements is formed on a surface of each bead in the first layer once the bead is contacted with the ambient atmosphere. As beads in the first layer cool, cores of beads partially solidify under ambient temperature. A second layer of beads is deposited on top of the first layer. A stabilizing shell composed of metastable intermetallics and mixed oxides of alloying elements is formed on a surface of each bead in the second layer once the bead is contacted with the ambient atmosphere. Oxides at the layer-to-layer interface dissolve due to the presence of energetically favored metastable intermetallics. In addition, as the beads in the second layer cool, the metastable intermetallics in the stabilizing shells at the layer-to-layer interface decompose and transform into a eutectic intermetallic at the bead-to-bead interfaces. These reactions cause localized welding of layers.

Figure 14:
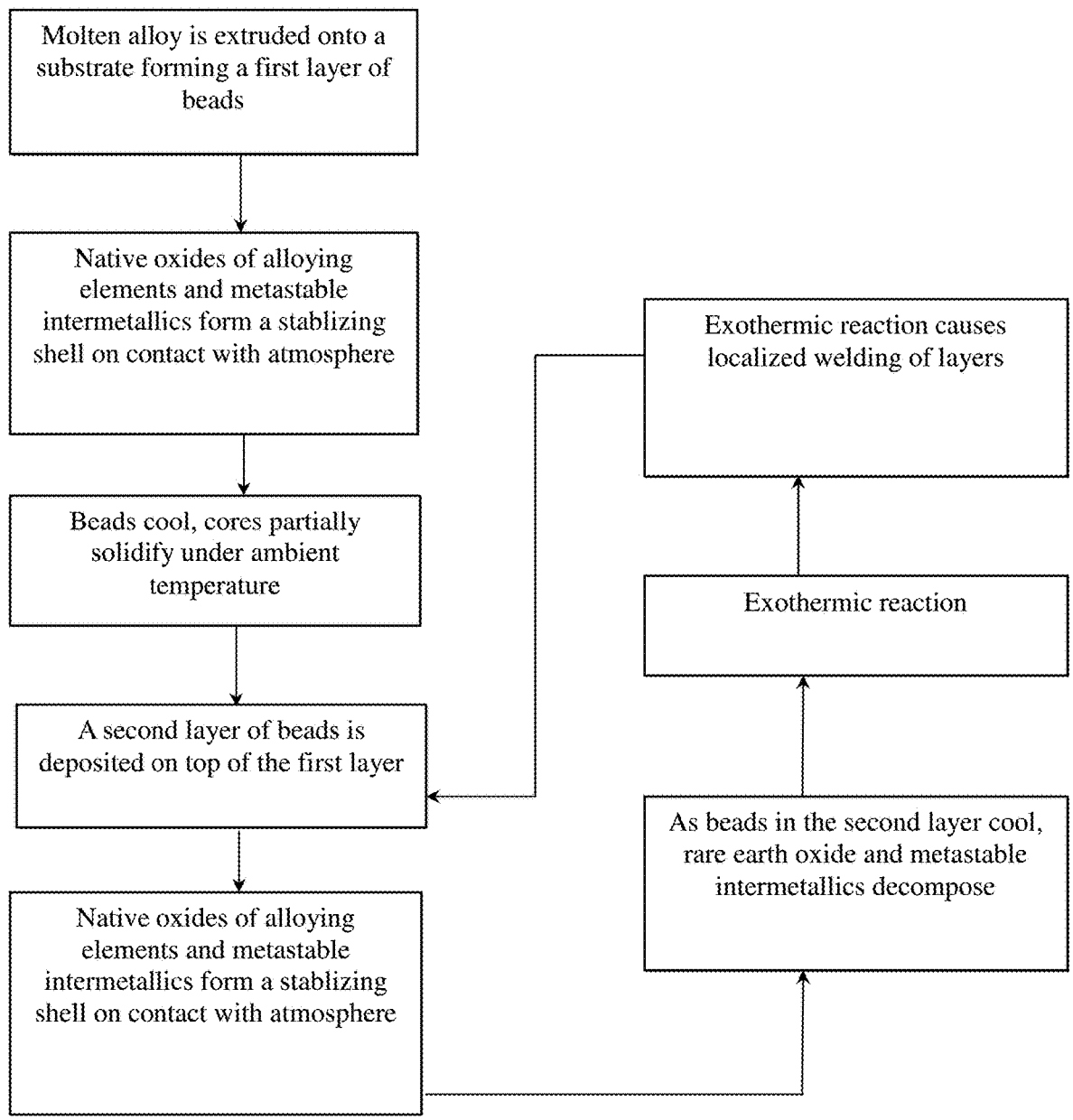
FIG. 14 is a flowchart illustrating a third mechanism that may account for the formation of fused layers of beads of an alloy of the present invention.

FIG. 14 is a flowchart illustrating a third mechanism that may account for the formation of fused layers of beads of the alloy. As shown, a molten alloy of the present invention is extruded onto a substrate, thereby forming a first layer of beads. A stabilizing shell composed of native oxides of alloying elements and metastable intermetallics is formed on a surface of each bead in the first layer once the bead is contacted with the ambient atmosphere. As beads in the first layer cool, cores of beads partially solidify under ambient temperature. A second layer of beads is deposited on top of the first layer. A stabilizing shell composed of native oxides of alloying elements and metastable intermetallics is formed on a surface of each bead in the second layer once the bead is contacted with the ambient atmosphere. As beads in the second layer cools, rare earth oxide and metastable intermetallics at the layer-to-layer interface decompose, thereby forming a eutectic intermetallic at the interface. The exothermic reaction causes localized welding of layers.

Figure 15:
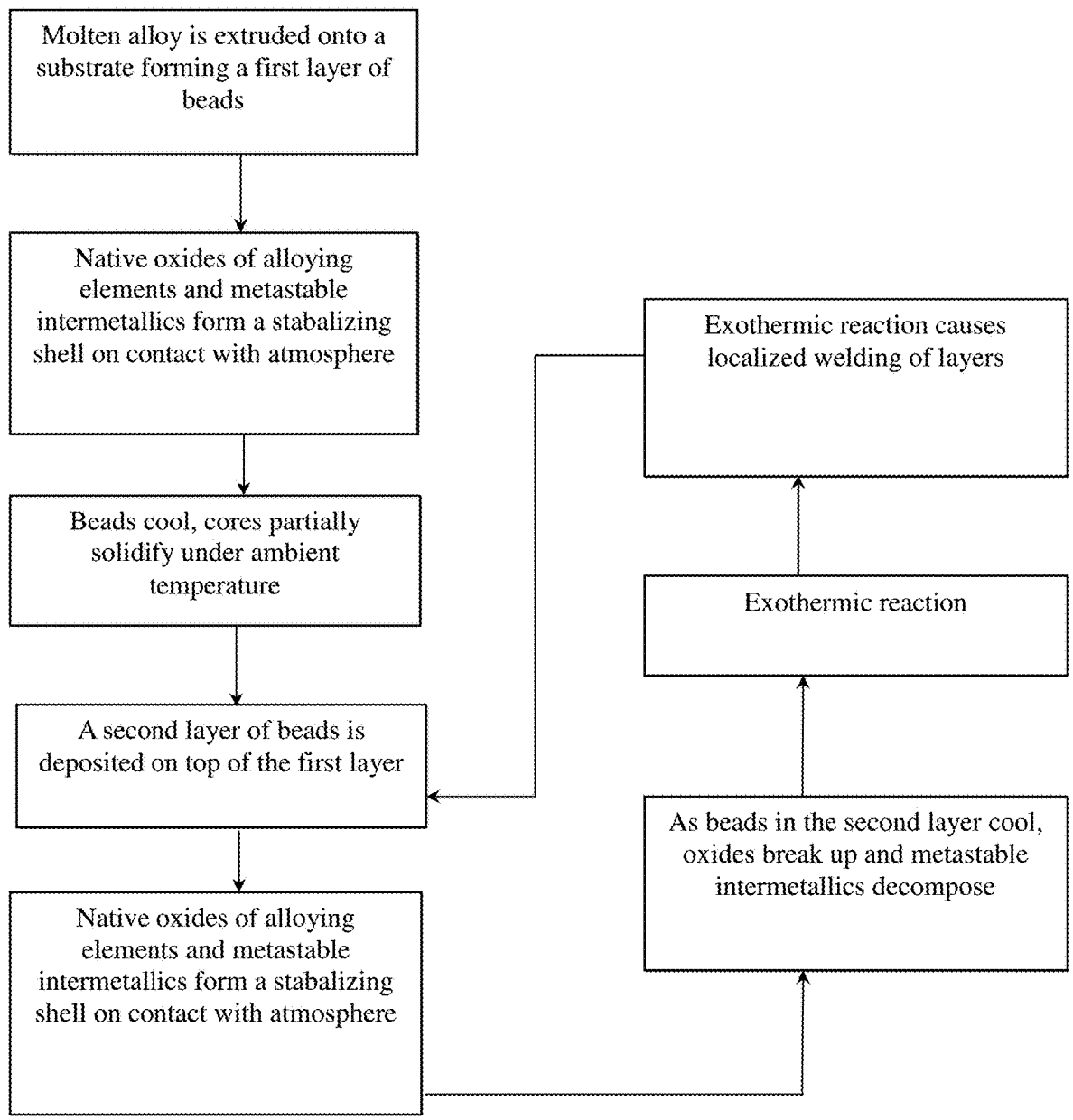
FIG. 15 is a flowchart illustrating a fourth mechanism that may account for the formation of fused layers of beads of an alloy of the present invention.

FIG. 15 is a flowchart illustrating a fourth mechanism that may account for the formation of fused layers of alloy beads. As shown, a molten alloy of the present invention is extruded onto a substrate, thereby forming a first layer of beads. A stabilizing shell composed of native oxides of alloying elements and metastable intermetallics is formed on a surface of each bead in the first layer once the bead is contacted with the ambient atmosphere. As beads in the first layer cool, cores of beads partially solidify under ambient temperature. A second layer of beads is deposited on top of the first layer. A stabilizing shell composed of native oxides of alloying elements and metastable intermetallics is formed on a surface of each bead in the second layer once the bead is contacted with ambient atmosphere. As beads in the second layer cools, oxides break up and metastable intermetallics decompose at the layer-to-layer interface, thereby forming a eutectic intermetallic at the interface. The exothermic reaction causes localized welding of layers.

Figure 16:
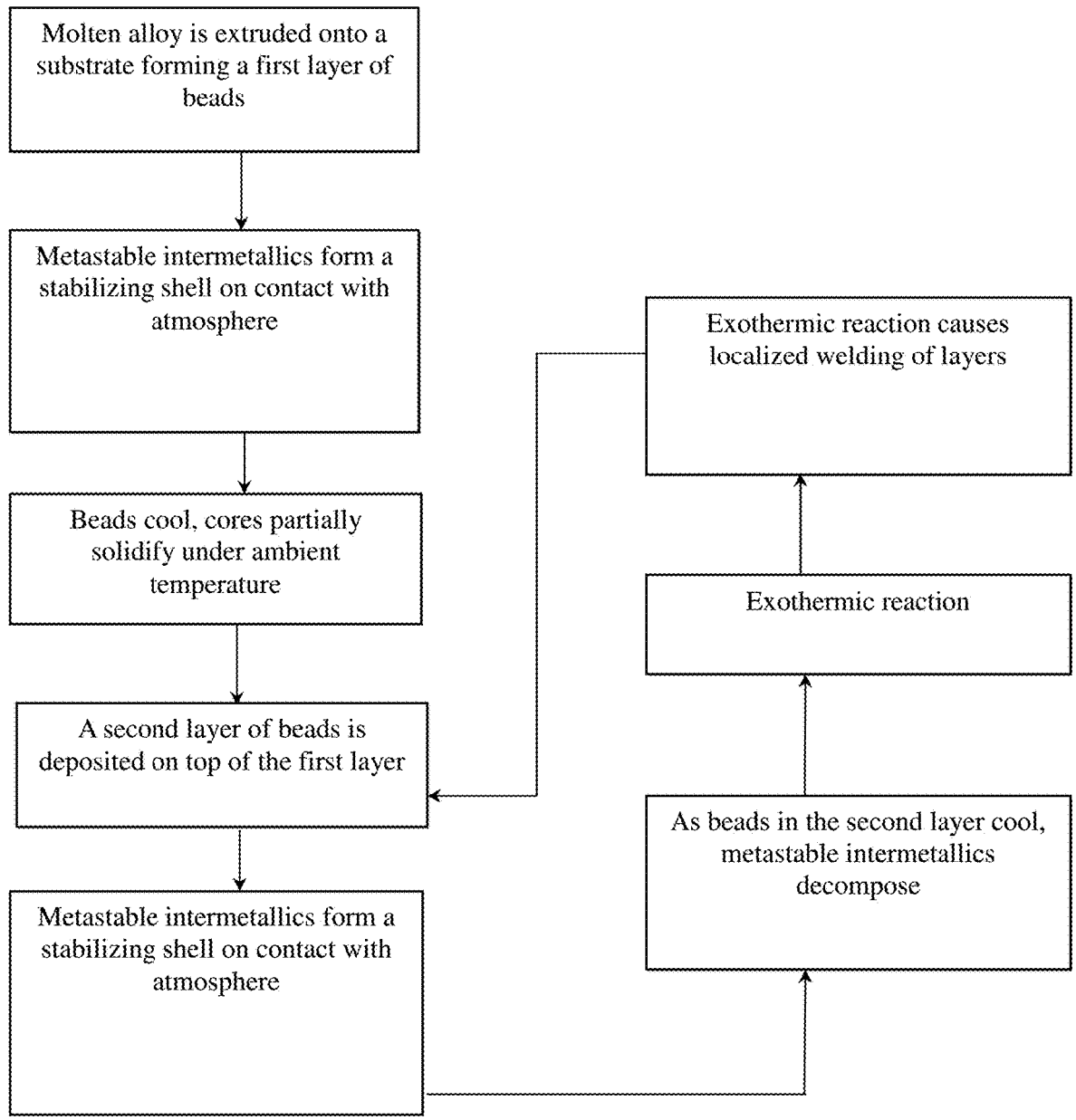
FIG. 16 is a flowchart illustrating a fourth mechanism that may account for the formation of fused layers of beads of an alloy of the present invention.

FIG. 16 is a flowchart illustrating a fifth mechanism that may account for the formation of fused layers of alloy beads. As shown, a molten alloy of the present invention is extruded onto a substrate, thereby forming a first layer of beads. A stabilizing shell composed of metastable intermetallics is formed on a surface of each bead in the first layer once the bead is contacted with the ambient atmosphere. As beads in the first layer cool, cores of beads partially solidify under the ambient temperature. A second layer of beads is deposited on top of the first layer. A stabilizing shell composed of metastable intermetallics is formed on a surface of each bead in the second layer once the bead is contacted with the ambient atmosphere. As beads in the second layer cools, the metastable intermetallics decompose at the layer-to-layer interface, thereby forming a eutectic intermetallic at the interface. The exothermic reaction causes localized welding of layers.

Examples

Characteristics of Al-6Ce Alloy

An Al-6Ce alloy containing 6 wt. % of Ce was tested and found to have suitable beading characteristics attributable to formation of a rare earth-rich shell at the exposed surface of the bead.

Figure 17:
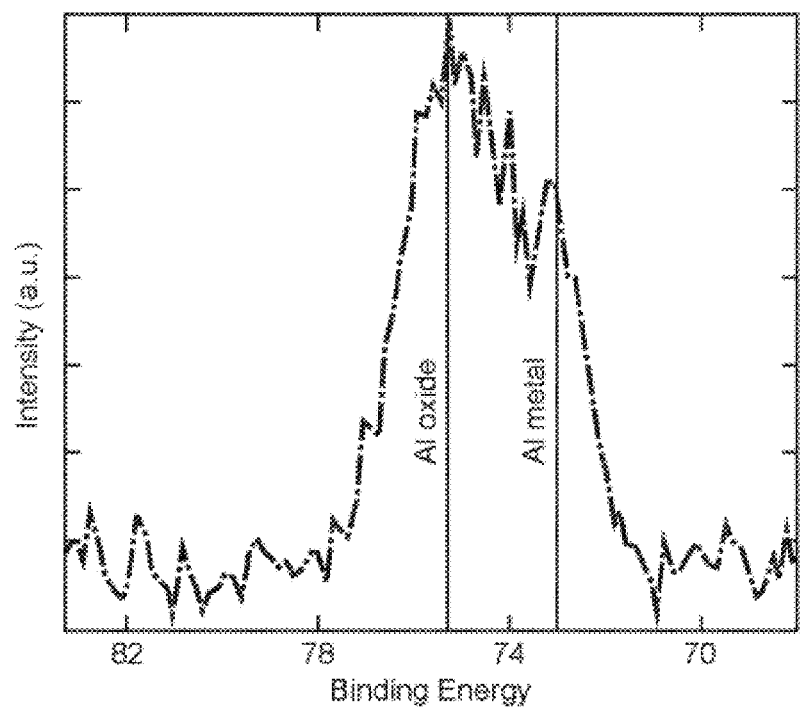
FIG. 17 is a graph showing photoelectron spectroscopy (XPS) data for the surface of an as-cast sample of Al-6Ce. Intensity of detected photoelectrons is measured in arbitrary units (a.u.)
Figure 18:
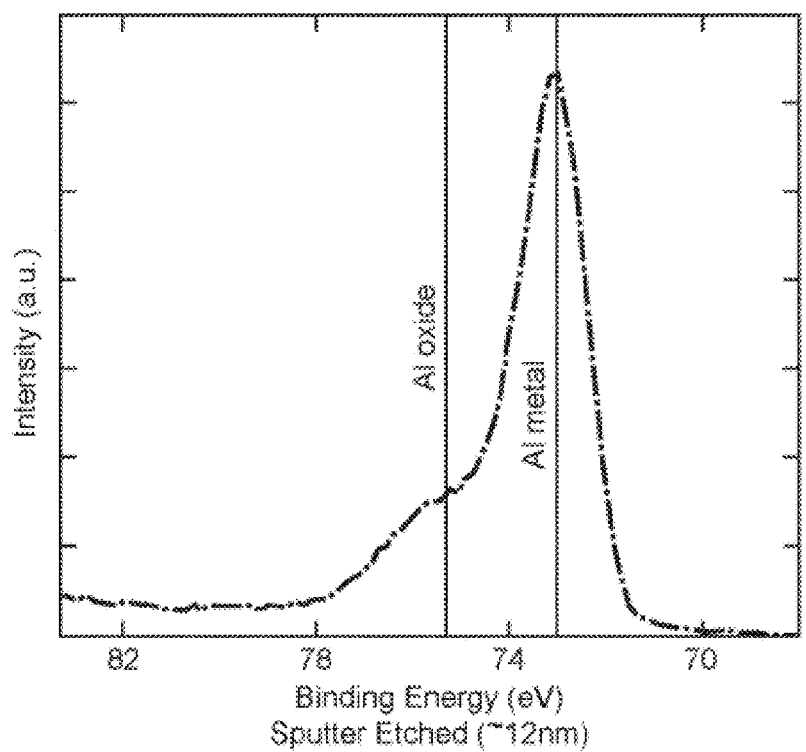
FIG. 18 is a graph showing XPS data for an as-cast sample of Al-6Ce after sputter etching to a depth of 12 nm.

FIG. 17 is a plot of photoelectron spectroscopy (XPS) data for an as-cast sample of an Al-6Ce alloy, while FIG. 18 shows XPS data for the Al-6Ce alloy following sputter etching to remove about 12 nm of surface material. The peak resulting from the presence of oxide has near zero intensity, which indicates that the stabilizing shell is on the order of 10-15 nm in thickness.

Figure 19:
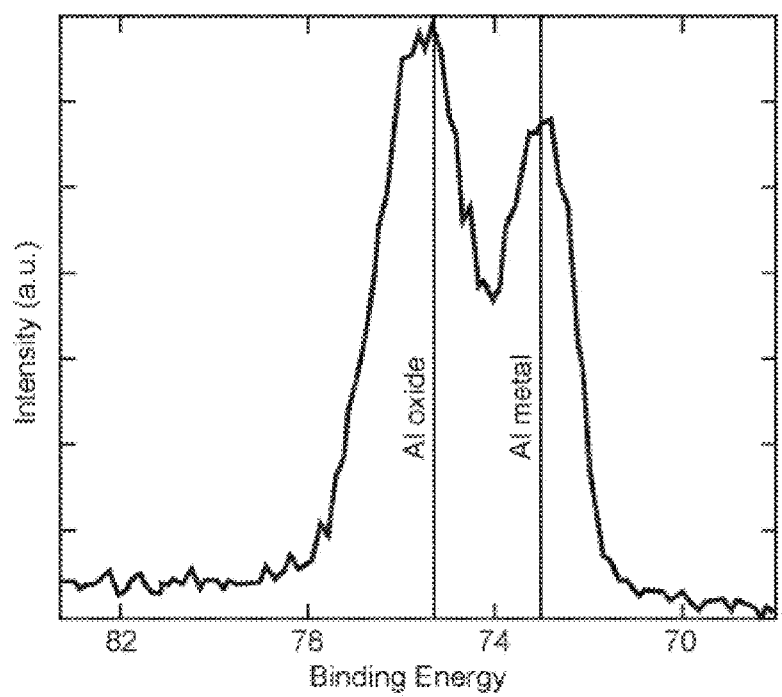
FIG. 19 is a graph showing XPS data for the surface of a heat treated sample of Al-6Ce.
Figure 20:
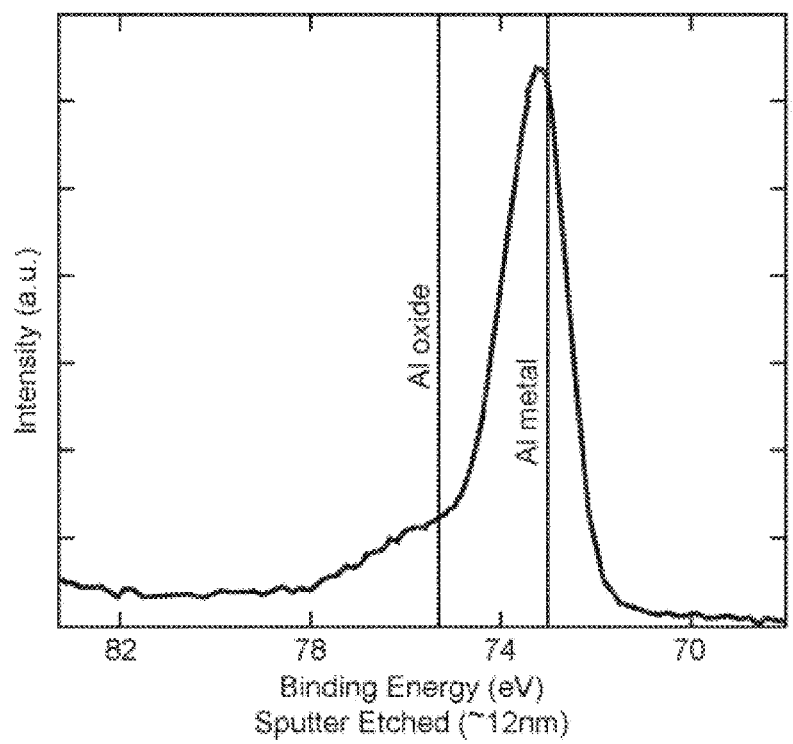
FIG. 20 is a graph showing XPS data for a heat treated sample of Al-6Ce after sputter etching to a depth of 12 nm.
Figure 21:
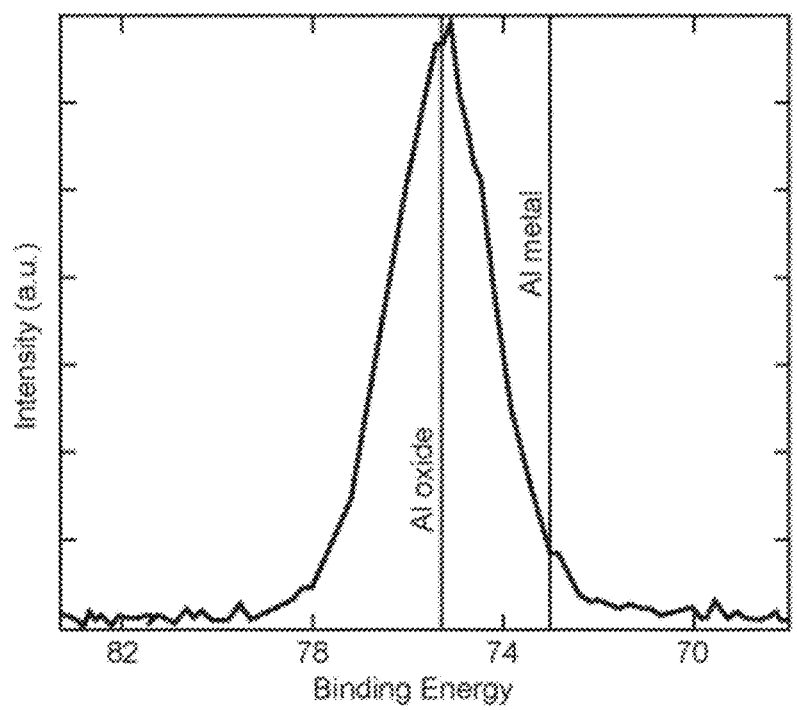
FIG. 21 is a graph showing XPS data for an oxidized sample of Al-6Ce.
Figure 22:
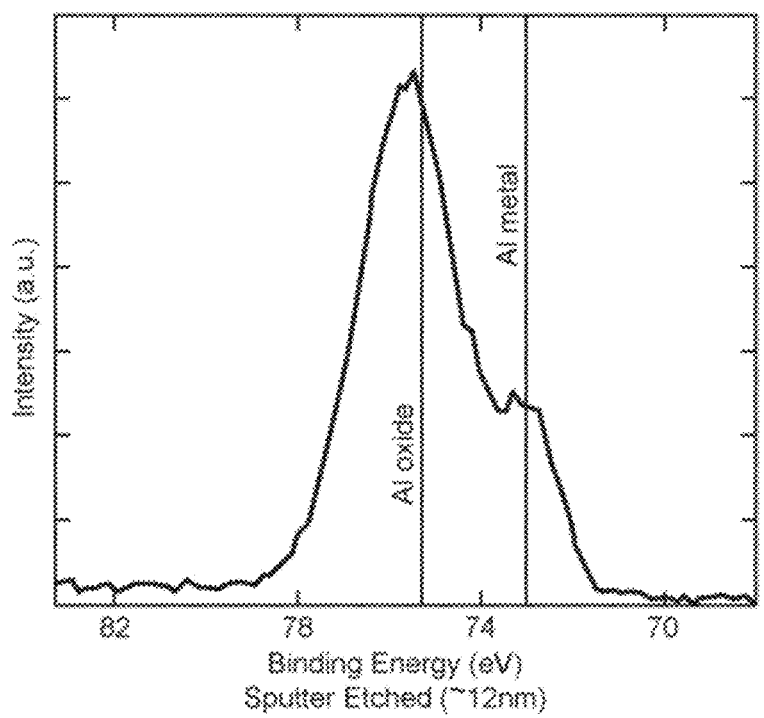
FIG. 22 is a graph showing XPS data for an oxidized sample of Al-6Ce after sputter etching to a depth of 12 nm.

FIGS. 19 and 20 show respective XPS data for heat-treated and heat-treated sputter-etched samples of the Al-6Ce alloy. FIGS. 21 and 22 show respective XPS data for oxidized and oxidized sputter-etched samples of the Al-6Ce alloy. The data show that, after 12 nm of etching, the oxide present at the surface of the material has dissipated and the internal structure is bulk metallic material.

Figure 23:
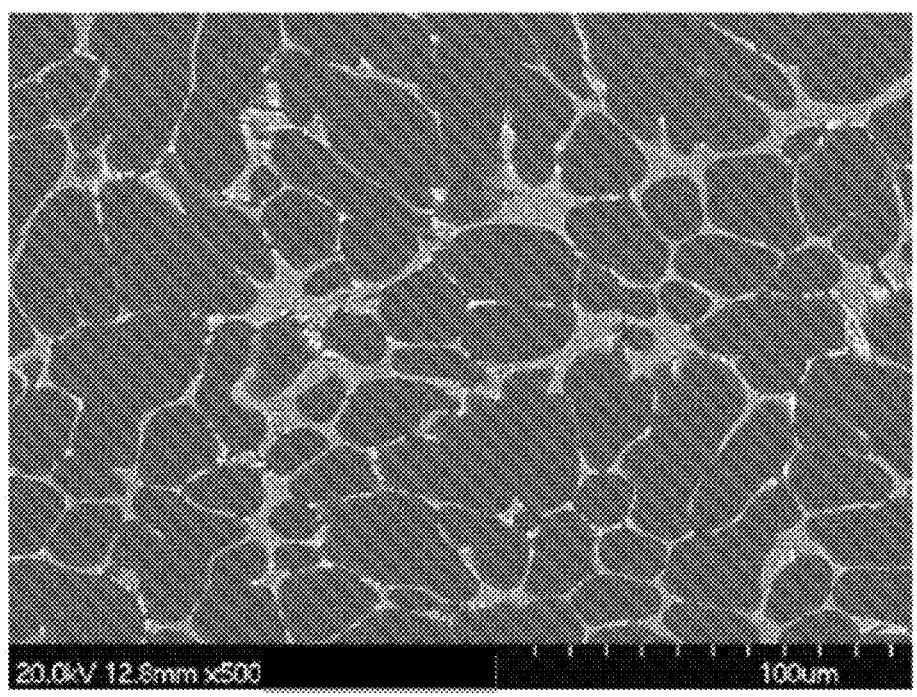
FIG. 23 is a low-magnification scanning electron micrograph (SEM) image of Al-6Ce.
Figure 24:
FIG. 24 is a high magnification SEM image of Al-6Ce.

FIGS. 23 and 24 show respective low and high magnification SEM images of the Al-6Ce alloy respectively. The SEM images show a low content (~6.7 weight %) of a eutectic $Al_{11}Ce_3$ intermetallic phase. $Al_{11}Ce_3$ eutectic intermetallic and Al microconstituent surrounds the primary Al FCC grains. The microstructure shows a divorced morphology.

Figure 25:
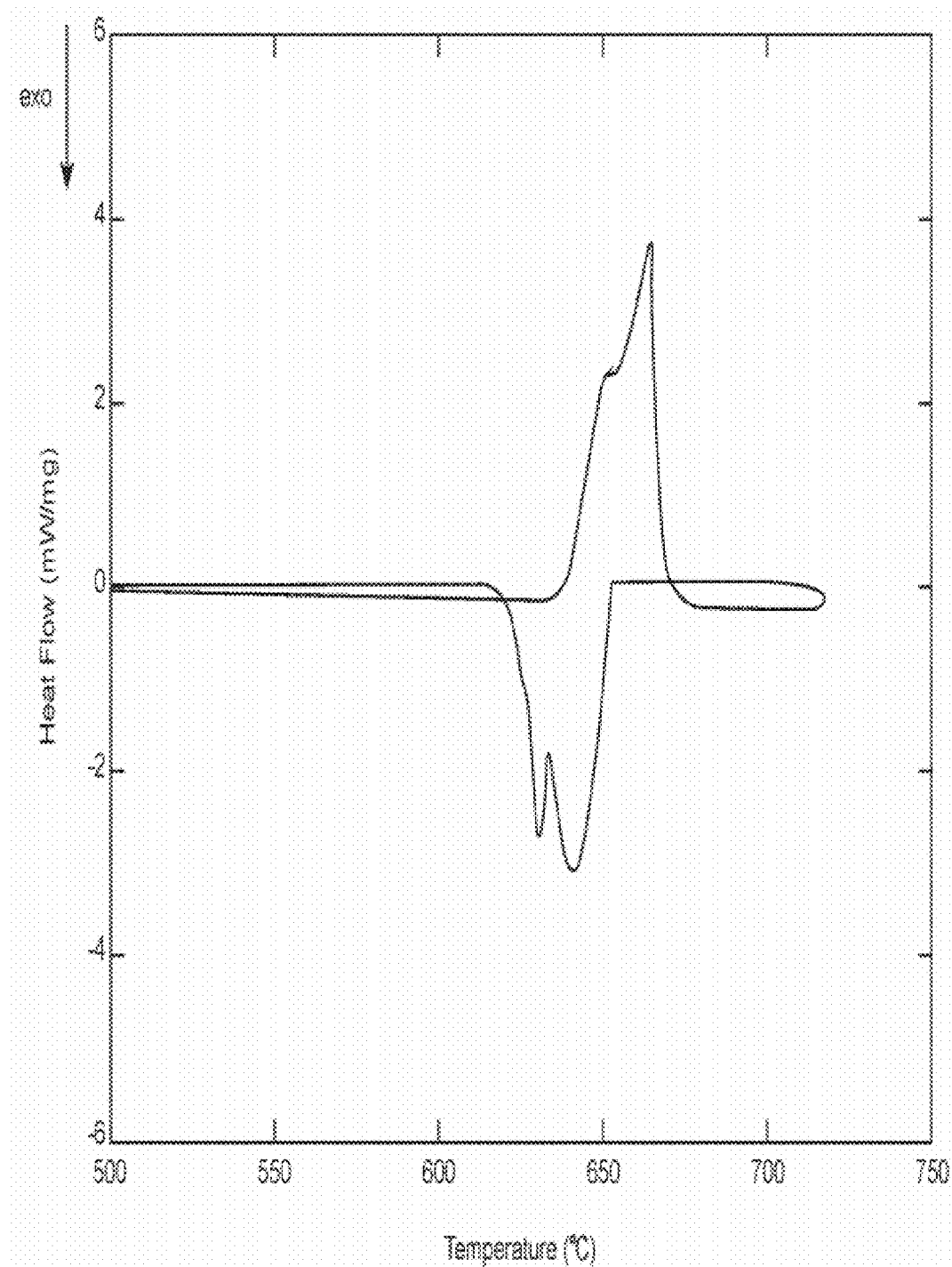
FIG. 25 is a graph showing differential scanning calorimetry (DSC) data for Al-6Ce shown in FIGS. 25 and 26.

FIG. 25 shows DSC data for the Al-6Ce alloy. It can be seen that the Al-6Ce alloy starts to melt at approximately 640° C., and there are no measurable phase shifts before the Al-6Ce alloy melts.

Figure 26A:
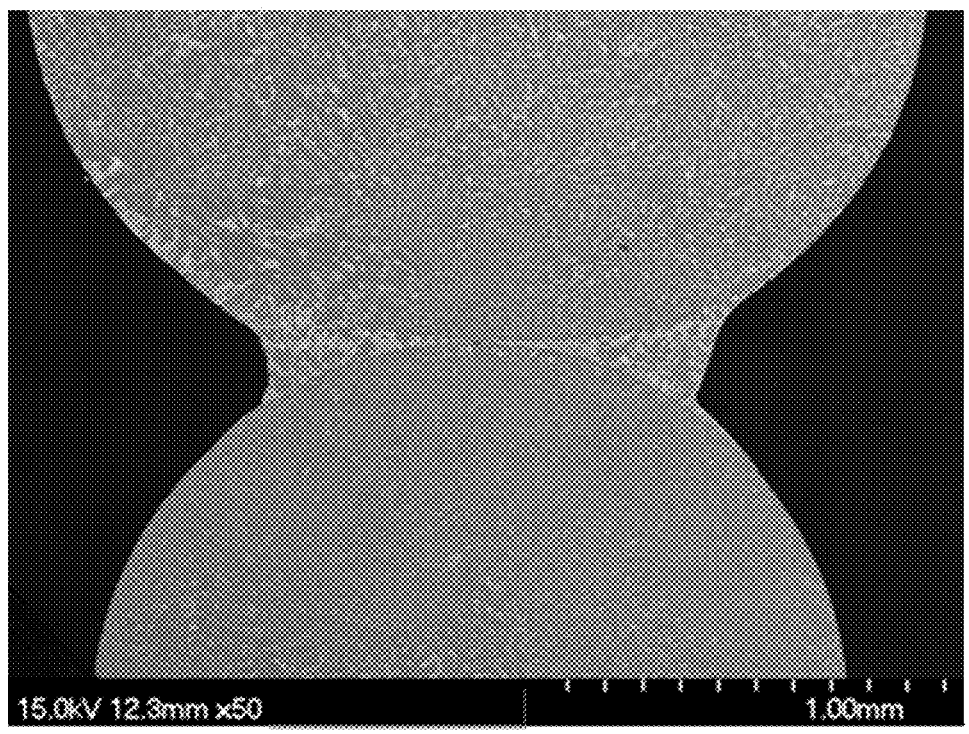
FIG. 26A is a SEM image of fused beads of Al-6Ce.
Figure 26B:
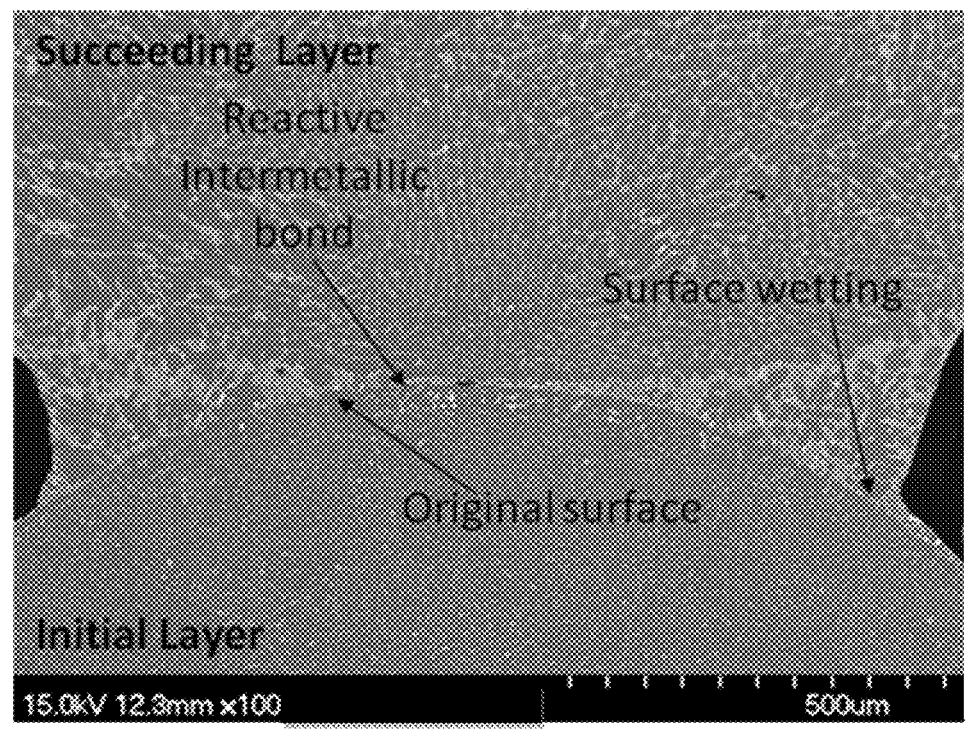
FIG. 26B is a higher magnification SEM image showing the wetting surface of the fused beads of FIG. 26A.

FIG. 26A shows a SEM image of fused beads of the Al-6Ce alloy. FIG. 26B is a higher magnification SEM image showing the wetting surface of the fused beads of FIG. 26A. The light gray areas represent eutectic $Al_{11}C_3$ phases, and the dark gray area represents an Al phase. It can be seen the amount of the eutectic $Al_{11}Ce_3$ phases in the interface of the beads is greater than that of the eutectic $Al_{11}Ce_3$ phases within the beads. The formation of the $Al_{11}Ce_3$ eutectic intermetallic at the interface is believed to be primarily involved in the welding of the beads.

Characteristics of Al—Ce—Si Alloys

Al—Ce—Si alloys exhibit similar rheological properties to that of the binary Al—Ce alloy. At high intermetallic contents (>7.5 wt. %), the Al—Ce—Si alloys flow too well and, as a result, will not bead sufficiently for printing. Thus, it is necessary to maintain an overall low content of intermetallic (0.50 to up to 7.5 wt %) when utilizing ternary or quaternary additions to the binary alloy.

Figure 27:
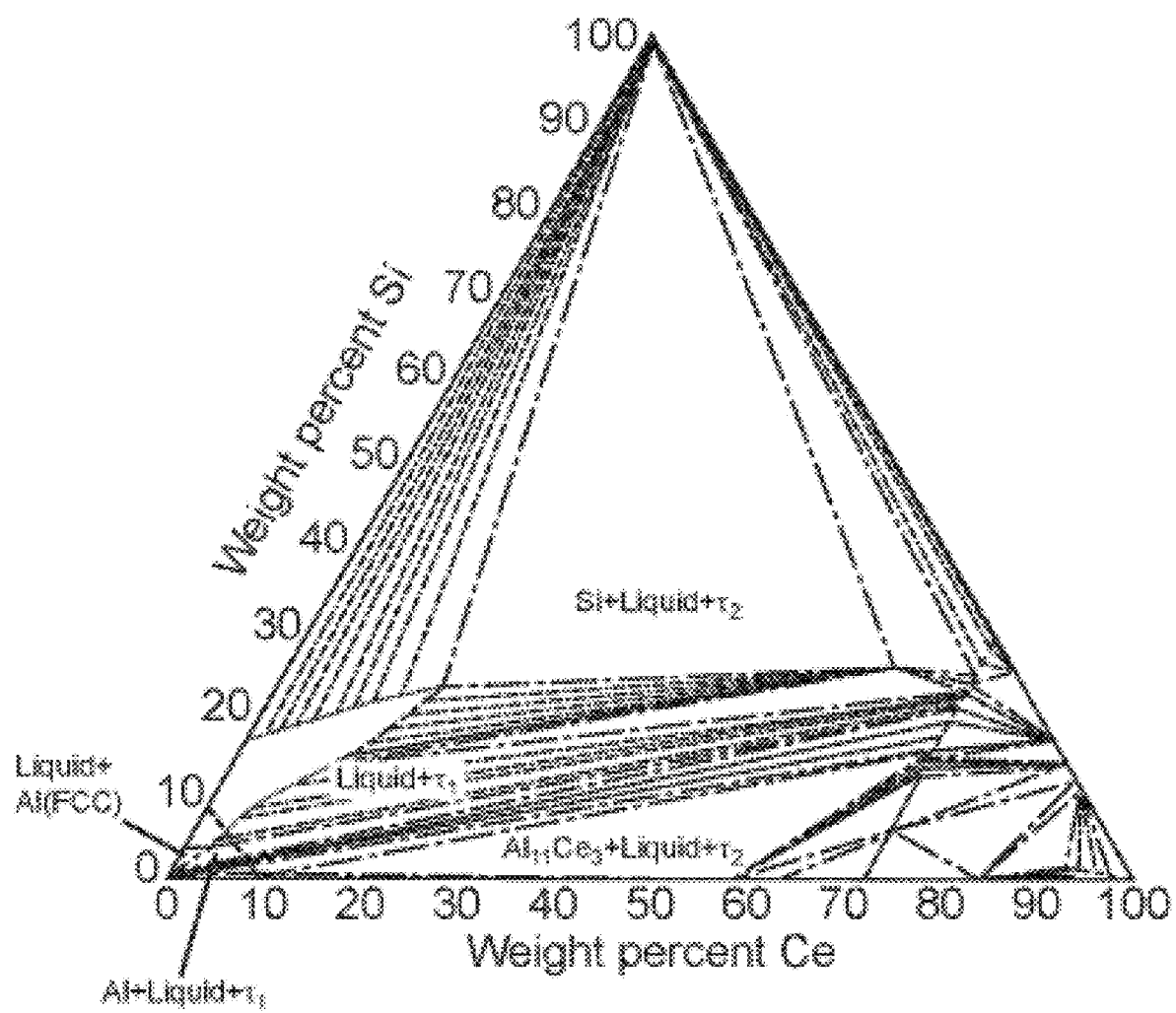
FIG. 27 is a graph showing a ternary isotherm for Al—Ce—Si alloy family at 639° C.; a few of the many phases are labeled.
Figure 28:
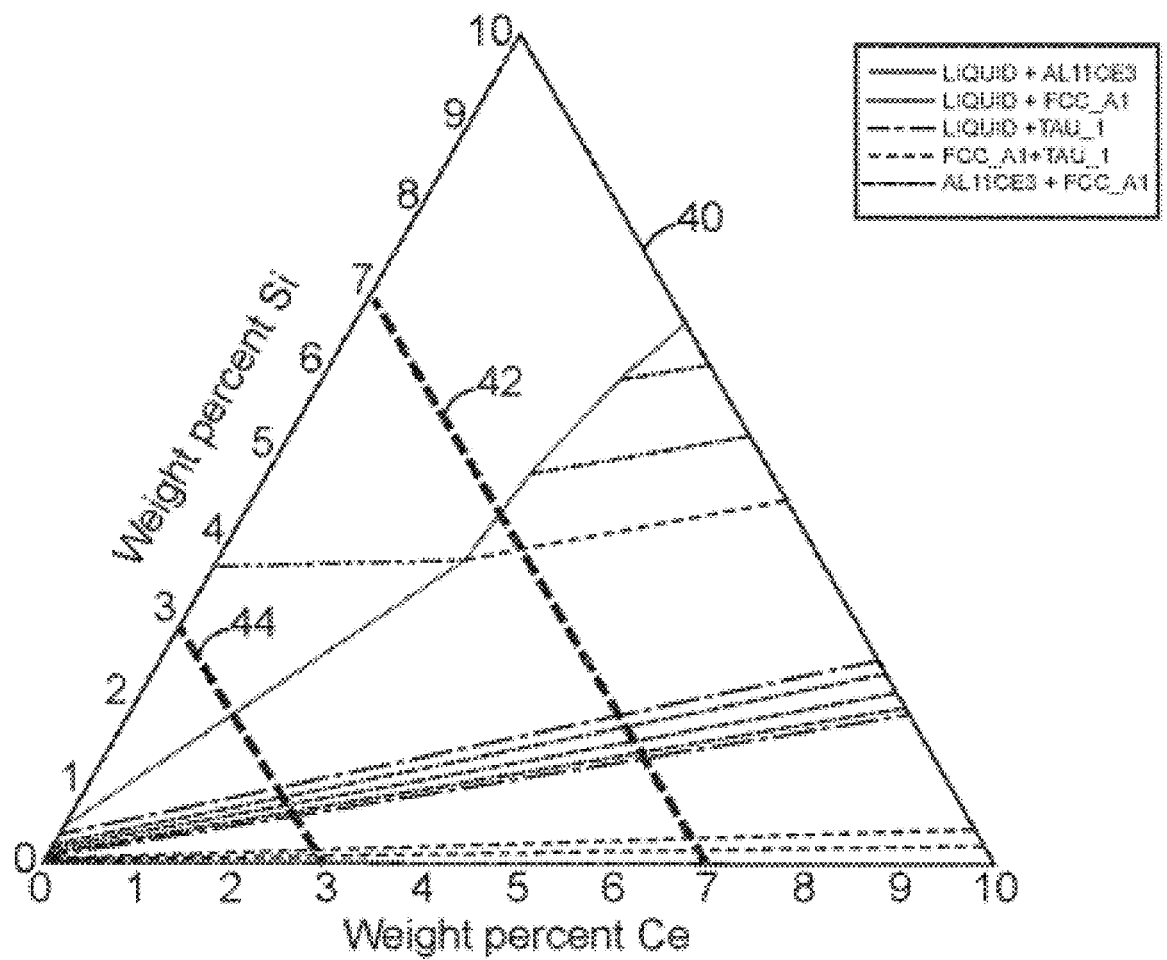
FIG. 28 is a graph showing an enlarged portion of FIG. 27 below the 10 mass percent line. Details and phases of interest are shown.
Figure 29:
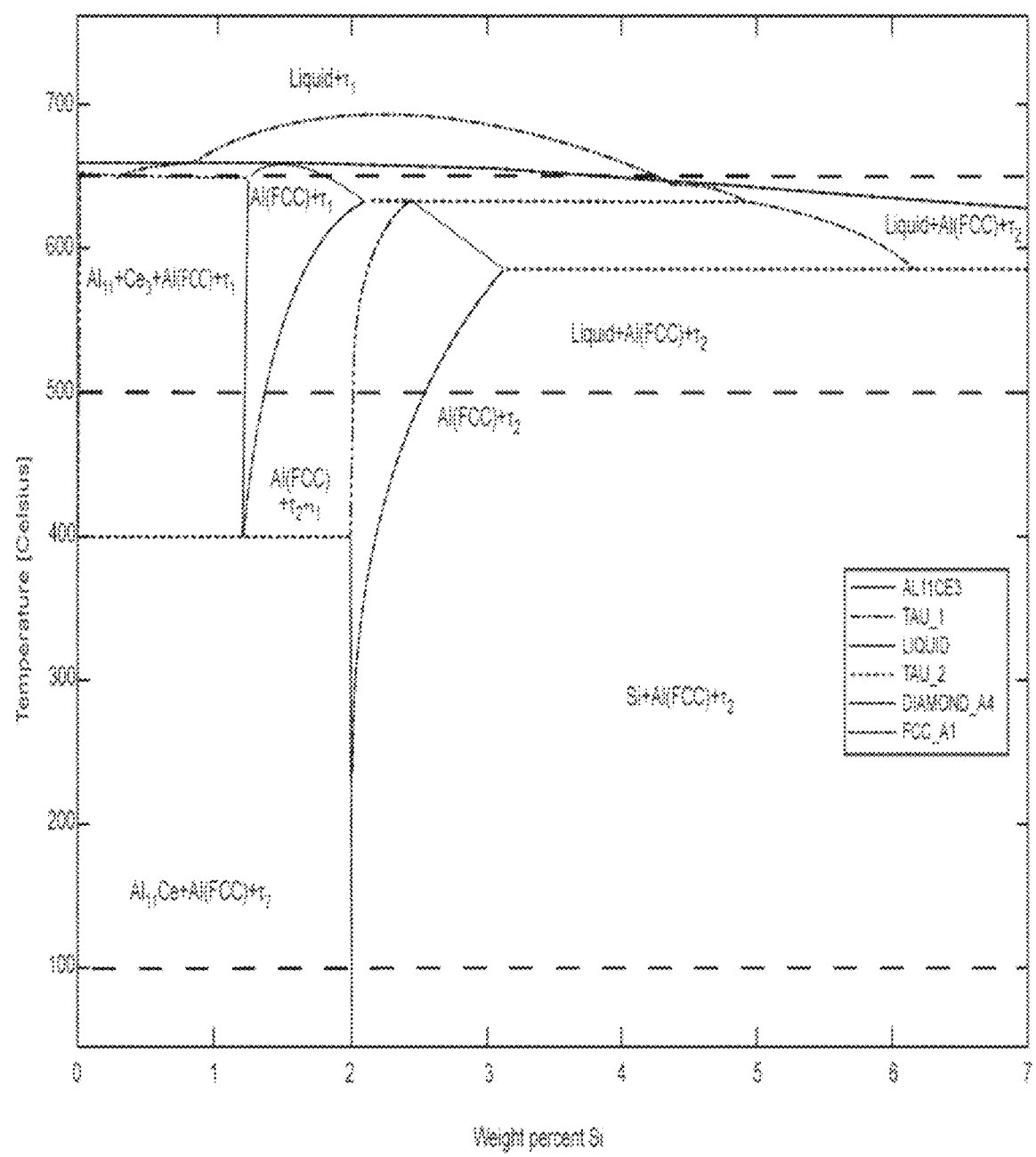
FIG. 29 is a graph showing the isopleth along the constant 93 wt. % Al composition line 42 shown in FIG. 27.
Figure 30:
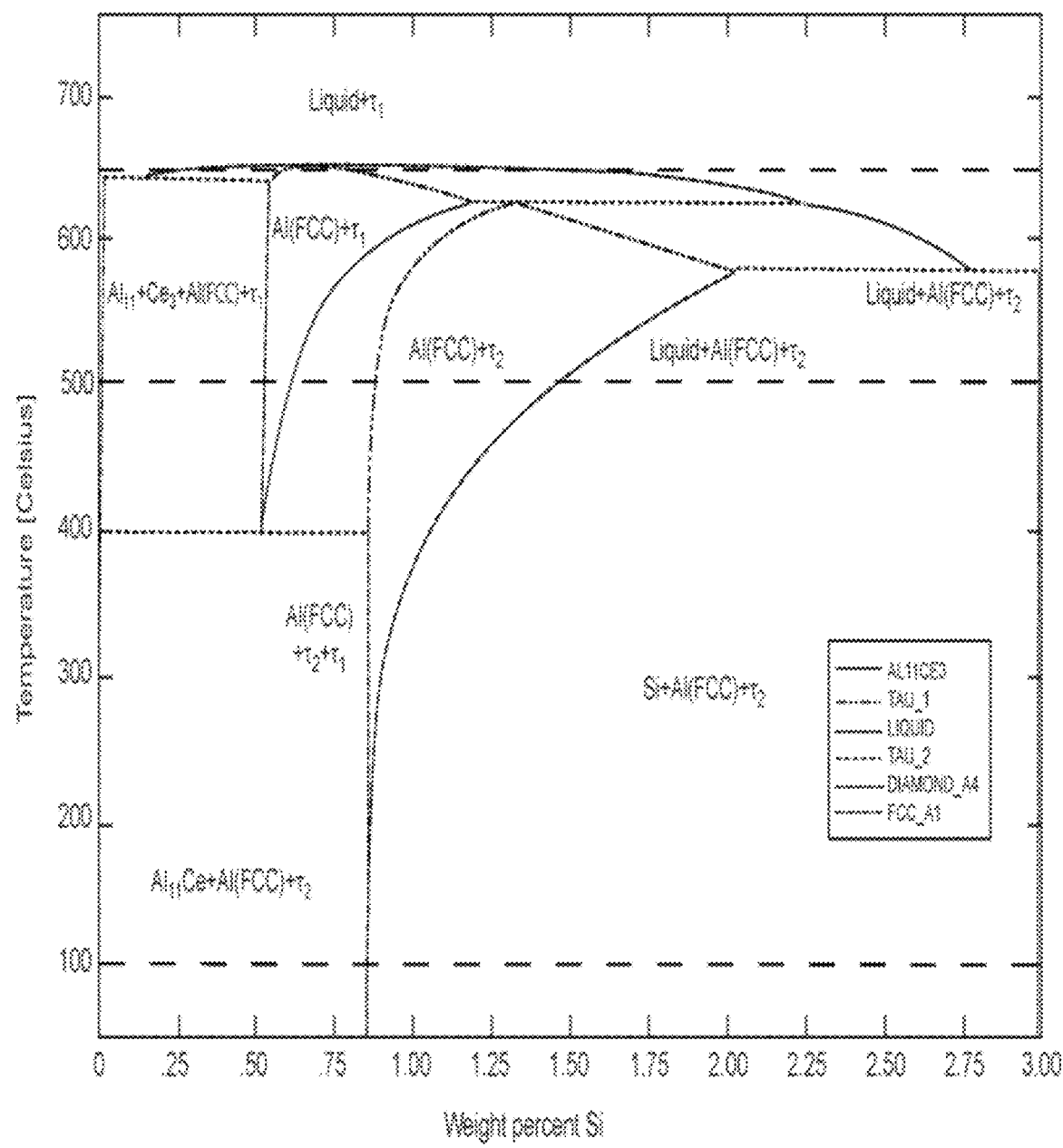
FIG. 30 is a graph showing the isopleth along the constant 97 wt. % Al composition line 44 shown in FIG. 27.
Figure 31:
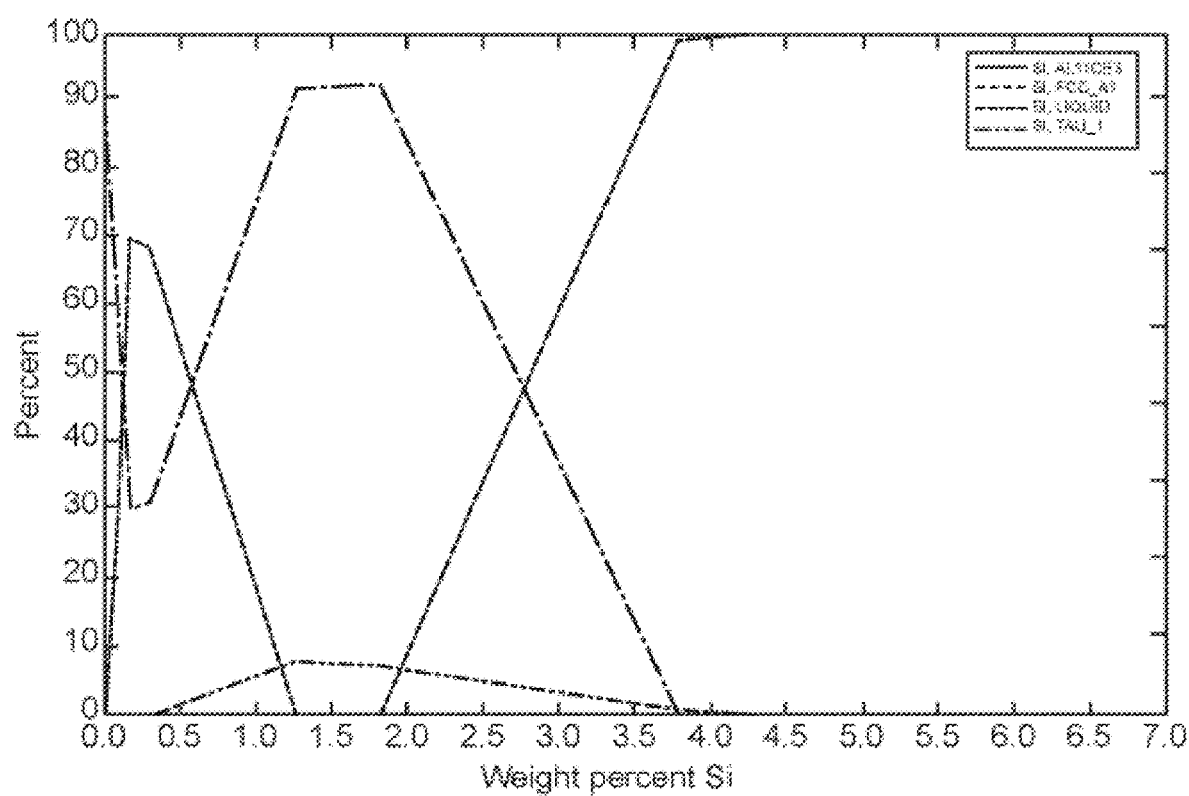
FIG. 31 is a graph showing the equilibrium phase fraction diagram of Al—Ce—Si alloy family along the 93 wt. % Al line 42 shown in FIG. 27.
Figure 32:
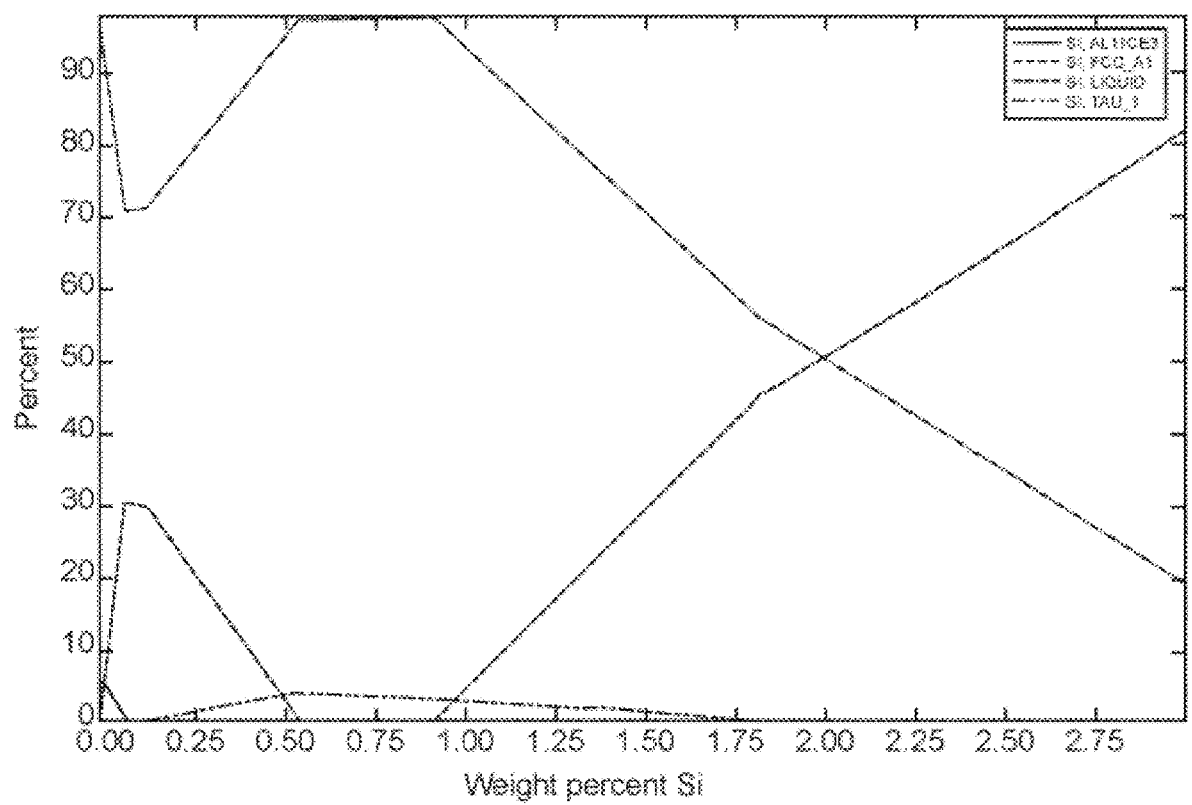
FIG. 32 is a graph showing the equilibrium phase fraction diagram of Al—Ce—Si alloy family along the 97 wt. % Al line 44 shown in FIG. 27.

FIGS. 27-32 provide detailed characteristics of the Al—Ce—Si alloy family and intermetallic properties thereof. FIG. 27 shows a full ternary isotherm for the Al—Ce—Si ternary alloy family at 639° C., and FIG. 28 shows an enlarged portion of the Al—Ce—Si ternary alloy family shown in FIG. 27 below the 10 wt. % line 40. Heavy dashed lines 42 and 44 represent respective position of isopleths and property diagrams at 93 wt. % Al and 97 wt. % Al. FIGS. 29 and 31 show the isopleth and property diagrams along the 93 wt. % Al composition line A shown in FIG. 27. FIGS. 30 and 32 show the isopleth and property diagrams along 97 wt. % Al composition line B shown in FIG. 27.

The data in FIGS. 27-32 show that in instances where Al content is held constant but the Si and Ce are varied to balance, the different phases which precipitate form out of the melt and the base Al-6Ce contains roughly 7 weight % intermetallic, which is near the maximum intermetallic content that is suitable for structural direct-write additive manufacturing. Thus, in order to precipitate the same weight percent of Al—Ce—Si intermetallic, it is required that the overall composition is greater than 7 wt. % alloying additions. In the case of the Al—Ce—Si alloy, the highest weight % of alloying elements which produce the necessary low amount of ternary intermetallic is about 9 wt. % of alloying additions, including 2 weight % of Si and 7 wt. % of Ce.

A low percentage of intermetallic (also called non-aluminum) phase fraction is preferable for the alloy. For example, for Al—Ce—Si alloys, an upper limit for 7 weight % of Ce results in an intermetallic content of about 6.66 weight %. Taking 6.66 weight % of intermetallic phase to be the upper limit for the Al—Ce—Si alloys, the amount of Ce and Si that should be present in the alloy can be calculated. Taking into account the lower limit of 0.5 wt. % Ce, which results in an intermetallic content of 0.549 wt. % intermetallic, the same relationship can be drawn.

Figure 33:
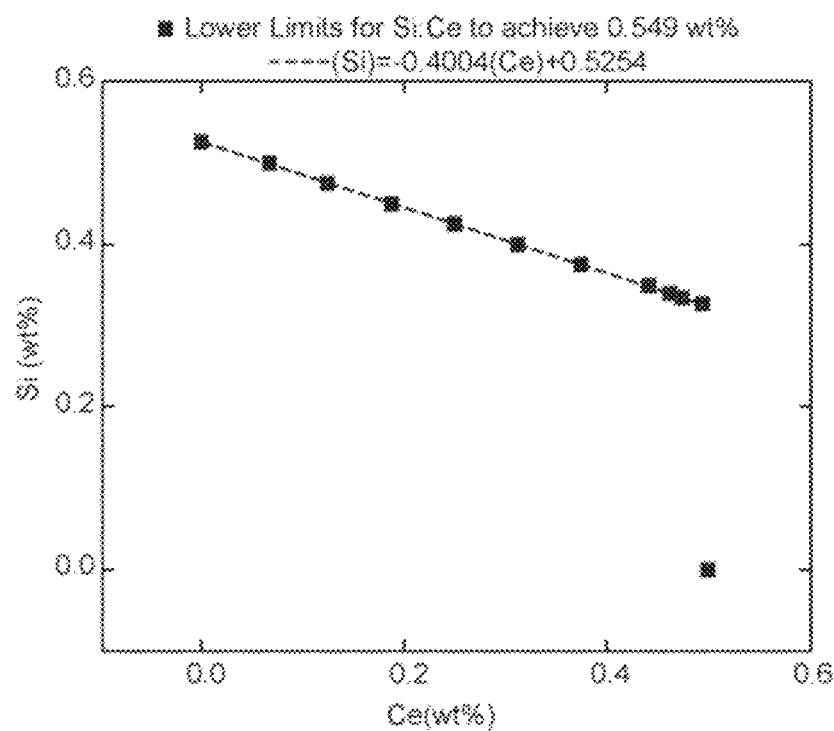
FIG. 33 is a graph showing minimum ratios needed to achieve 0.549 weight % non-Al phase content.

FIG. 33 shows a plot of the lower limits of Ce and Si that result in 0.549 wt. % of intermetallic phase, where (Si)=−0.4004 (Ce)+0.5254. An asymptotic behavior is observed at 0.5 wt. % cerium, wherein a small addition of Si greatly increases the amount of alloying addition necessary to reach the 0.549 wt. % intermetallic phase due at least in part to the good solubility of Si in Al. However, following the quick asymptotic behavior, the relation is linear. The intercept value reflects the weight percentage of Si necessary to obtain 0.549 wt. % of non-aluminum phase.

Figure 34:
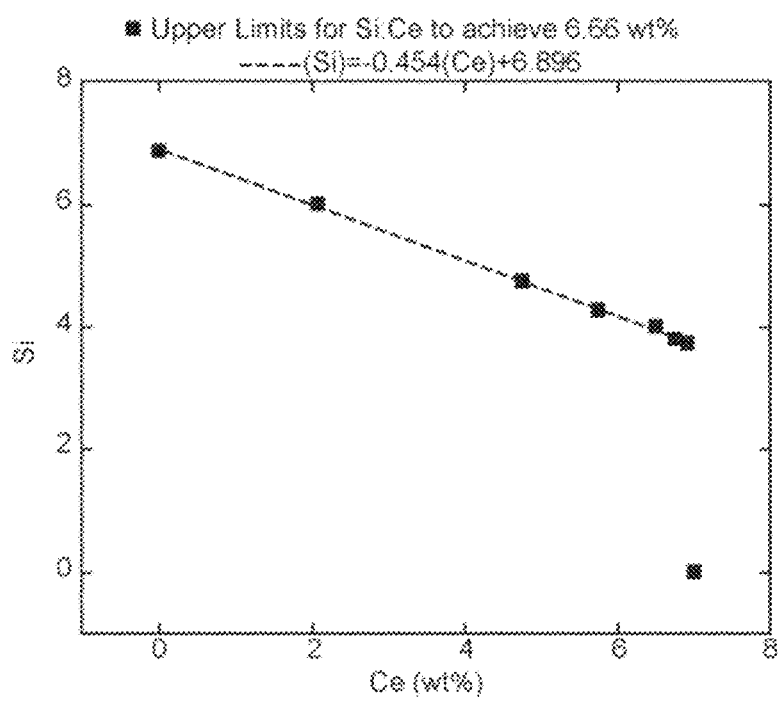
FIG. 34 is a graph showing minimum ratios needed to achieve 0.549 weight % non-Al phase content.

FIG. 34 shows a similar relationship for the upper limits of Ce and Si that result in 6.66 wt. % of intermetallic phase, where (Si)=−0.454 (Ce)+6.896. At the upper limit of 7 wt. % Ce, there is a distinct asymptotic behavior, but as Si is added, the relationship quickly becomes linear.

Figure 35:
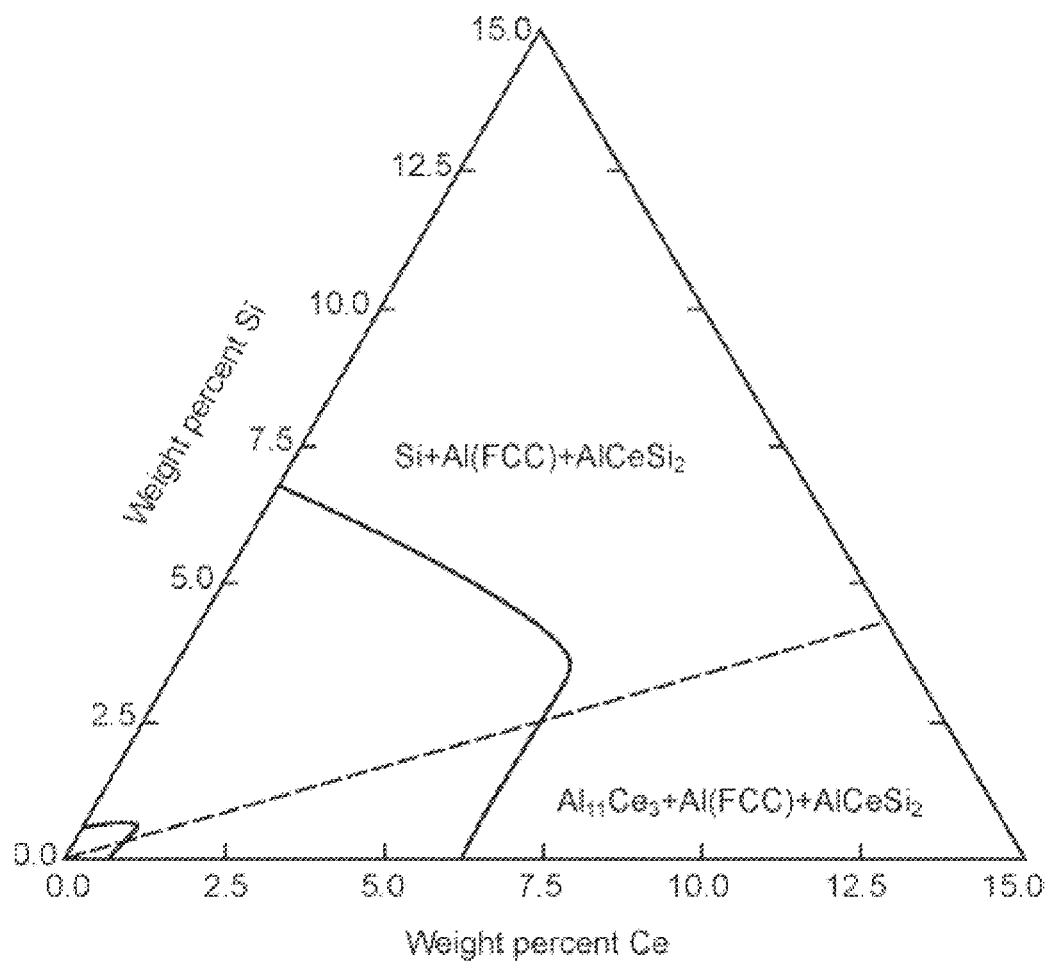
FIG. 35 is a diagram showing Al—Si—Ce ternary alloy isotherm at 100° C.
Figure 36:
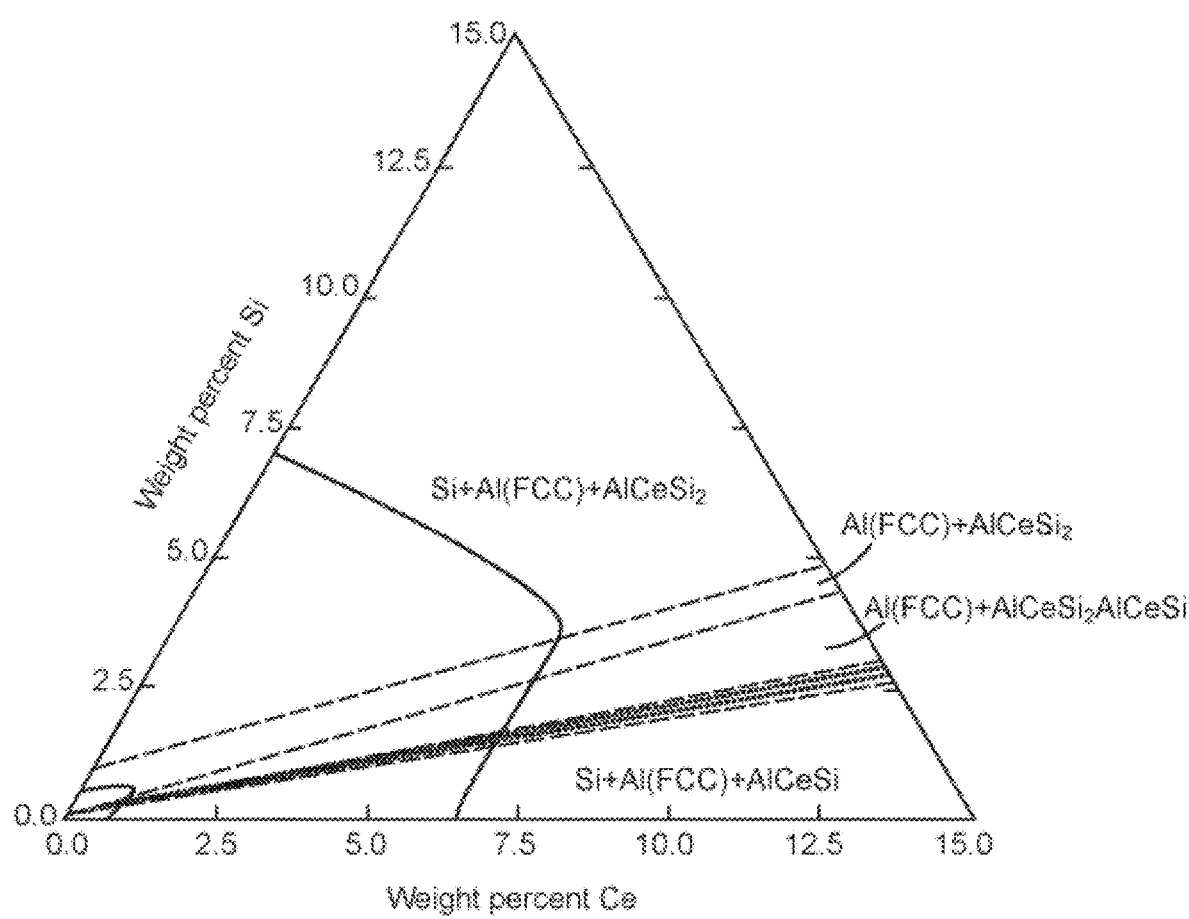
FIG. 36 is a diagram showing Al—Si—Ce ternary alloy isotherm at 500° C.
Figure 37:
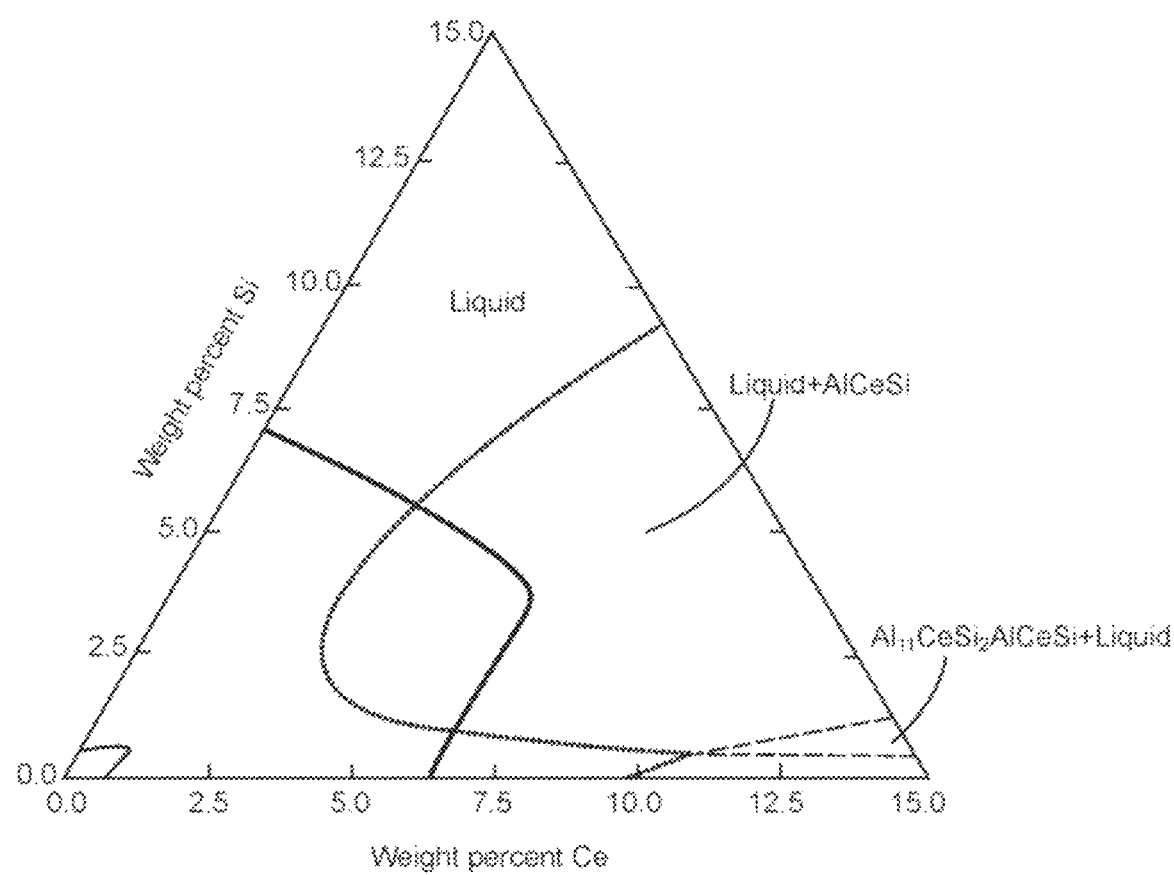
FIG. 37 is a diagram showing Al—Si—Ce ternary alloy isotherm at 650° C.
Figure 38:
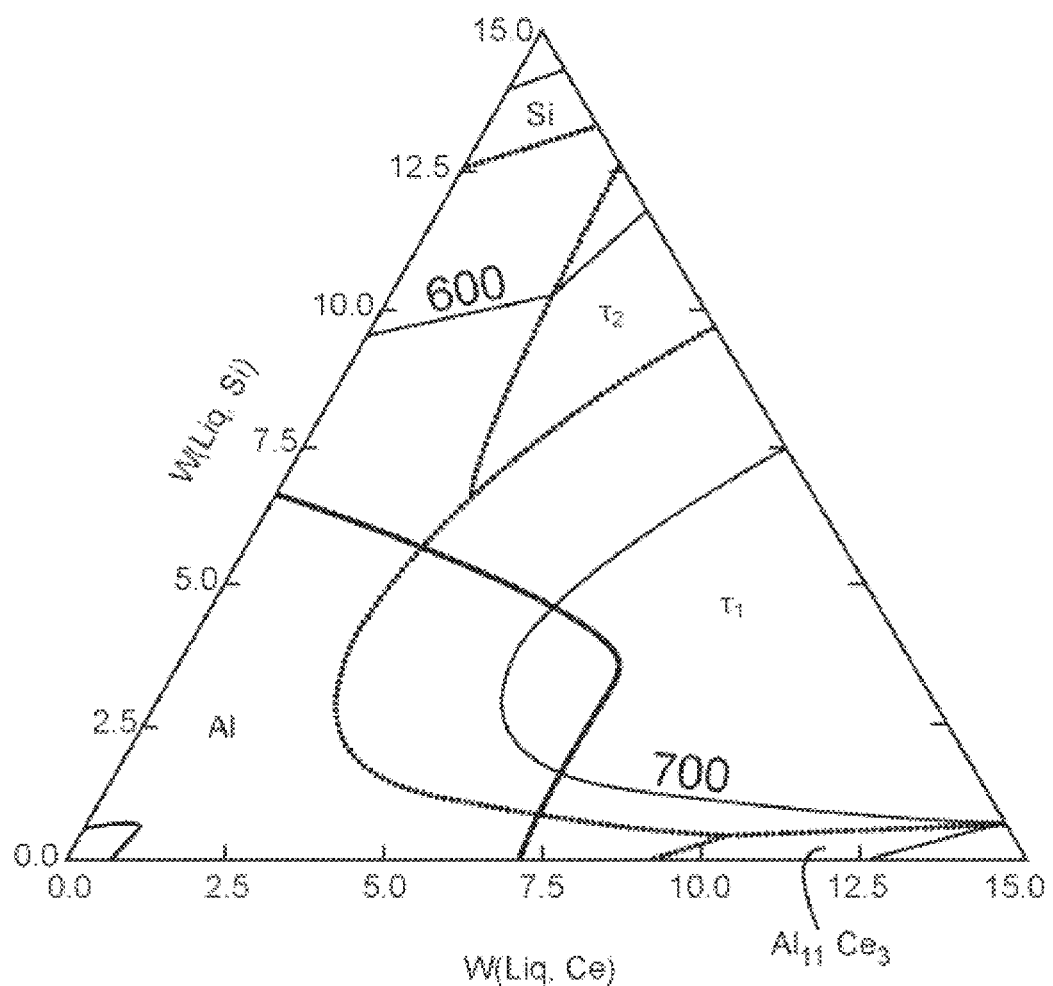
FIG. 38 is a diagram showing Al—Si—Ce ternary alloy liquidus.

FIG. 35 is a ternary phase diagram that shows a more graphical representation of the data presented in FIGS. 33 and 34. FIG. 36 shows an Al—Ce—Si ternary isotherm at 100° C. in the Al-rich region of the ternary phase diagram. FIG. 37 shows an Al—Ce—Si ternary isotherm at 500° C. FIG. 38 shows the presence of the liquid phase in the Al-rich region of the Al—Ce—Si ternary liquidus phase diagram. Heavy lines 52, 54 in FIGS. 35-38 represent phase compositional boundaries within which intermetallic content limits are satisfied. The area within lines 52, 54 represents Ce and Si contents of suitable compositions for structural direct-write additive manufacturing. Reference is also made to the respective isothermal lines in FIGS. 27 and 28.

While there have been shown and described what are at present considered the preferred embodiments of the invention, those skilled in the art may make various changes and modifications which remain within the scope of the invention defined by the appended claims.

What is claimed is:

1. A solid alloy composition comprising:
   (i) layers of an alloy comprising a base element selected from the group consisting of aluminum (Al), nickel (Ni) and a combination thereof, and a rare earth element selected from the group consisting of cerium (Ce), lanthanum (La), and combination thereof, and a eutectic intermetallic present within said alloy in an amount ranging from about 0.5 wt. % to 7.5 wt. %; and
   (ii) an interface functioning to weld the layers, wherein said interface contains said eutectic intermetallic in an amount greater than the amount of the eutectic intermetallic within the layers of the alloy.

2. The alloy of claim 1, wherein said rare earth element is Ce, wherein said Ce is present in said alloy in an amount up to 8 wt. %.

3. The alloy of claim 1, wherein said rare earth element is La, wherein said La is present in said alloy in an amount up to 10 weight percent %.

4. The alloy of claim 1, wherein said alloy further comprises at least one additional alloying element selected from the group consisting of iron (Fe), silicon (Si) and magnesium (Mg).

5. The alloy of claim 4, wherein Fe is present in said alloy in an amount up to 2 wt. %, Si is present in said alloy in an amount up to 2 wt. %, and Mg is present in said alloy in an amount up to 30 wt. %.

6. The alloy of claim 1, wherein said alloy further comprises an additive selected from the group consisted of SiC, carbon nanotube (CNT), alumina and boron nitride.

7. The alloy of claim 6, wherein said additive is present in said alloy in an amount up to 30 vol %.

8. The alloy of claim 1, wherein said alloy is an Al—Ce alloy, with said Ce present in an amount of about 0.5 to 7 wt. % by weight of said alloy, and said eutectic intermetallic is $Al_{11}Ce_3$.

9. The alloy of claim 1, wherein said alloy is an Al—La alloy, and said eutectic intermetallic is $Al_{11}La_3$.

* * * * *